US00RE50729E

(19) United States
(12) Reissued Patent
Rivera-Alsina et al.

(10) Patent Number: US RE50,729 E
(45) Date of Reissued Patent: Jan. 6, 2026

(54) MODULAR SHIP CABINS WITH IMPROVED INTERIOR CONFIGURATIONS

(71) Applicant: Royal Caribbean Cruises Ltd., Miami, FL (US)

(72) Inventors: Krissia Rivera-Alsina, Miami, FL (US); Harold Law, Miami Beach, FL (US)

(73) Assignee: Royal Caribbean Cruises Ltd., Miami, FL (US)

(21) Appl. No.: 18/770,510

(22) Filed: Jul. 11, 2024

Related U.S. Patent Documents

Reissue of:
(64) Patent No.: 11,383,796
Issued: Jul. 12, 2022
Appl. No.: 16/924,026
Filed: Jul. 8, 2020

(51) Int. Cl.
*B63B 29/02* (2006.01)
*B63B 25/00* (2006.01)

(52) U.S. Cl.
CPC ..... *B63B 29/025* (2013.01); *B63B 25/004* (2013.01); *B63B 2029/027* (2013.01)

(58) Field of Classification Search
CPC ..... B63B 29/025; B63B 29/02; B63B 29/10
See application file for complete search history.

(56) References Cited

U.S. PATENT DOCUMENTS 3,828,374 A * 8/1974 Del Missier ..... B63B 29/10 5/118
4,109,328 A * 8/1978 Mason ..... A47C 19/20 5/8

FOREIGN PATENT DOCUMENTS

FR 2530281 A1 * 7/1982
GB 2088292 A * 6/1982 ..... B63B 29/025
GB 2205281 A * 12/1988 ..... B63B 19/00
KR 101715597 B1 * 3/2017
WO WO-2008092383 A1 * 8/2008 ..... B61D 1/08
WO WO-2008092384 A1 * 8/2008 ..... B61D 1/08

OTHER PUBLICATIONS

FR-2530281-A1, Partial Translation. (Year: 1982).*
KR-101715597-B1, Partial Translation. (Year: 2017).*

* cited by examiner

*Primary Examiner* — Sarah B Mcpartlin
(74) *Attorney, Agent, or Firm* — Knobbe, Martens, Olson & Bear LLP

(57) ABSTRACT

A modular crew cabin system includes a plurality of crew cabin modules interchangeably installable within a plurality of spaces within one or more decks of a ship. A crew cabin module can include four walls, a ceiling, a floor, an upper bunk, and a lower bunk. The upper bunk and the lower bunk are disposed adjacent to two different walls in an L-shaped configuration. The ceiling includes a lower portion and a pop-up portion disposed above the upper bunk such that a 6-foot-tall occupant can sit up comfortably within either the upper bunk or the lower bunk. The pop-up portion of the ceiling may extend higher than an industry-standard ceiling height while permitting utility conduits to be routed over the lower portion of the ceiling. Storage space within the crew cabin module may be greater than one cubic meter.

21 Claims, 26 Drawing Sheets

MODULAR SHIP CABINS WITH IMPROVED INTERIOR CONFIGURATIONS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND

Technological Field

The present application relates to ship cabins, and more particularly to efficient interior configurations for modular cabin systems.

Description of the Related Art

Cruise ships are often described as floating cities. These ships are designed to provide every convenience and necessity to hundreds and in many cases thousands of passengers during a sailing that can range from 2 days to as many as 4 weeks. Cruise ships typically include sleeping accommodations for all passengers and crew, in some cases in the form of prefabricated modular staterooms or cabins which must be designed so as to fit within the predetermined dimensions of a portion of a deck of the ship. It is desirable to provide accommodations for crew members that efficiently use the minimal space available within a modular cabin configuration while providing a comfortable living space for extended time periods.

SUMMARY

The systems, methods, and devices of this disclosure each have several innovative aspects, no single one of which is solely responsible for its desirable attributes disclosed herein. Without limiting the scope of this disclosure, its more prominent features will now be discussed briefly. After considering this discussion, and particularly after reading the section entitled "Detailed Description" one will understand how the features of this disclosure provide advantages over other personalized recommendation solutions.

In a first aspect, a modular crew cabin system comprises a first space within a deck of a ship defined by a first length, a first width, and a first height; a second space within the deck defined by the first length, the first width, and the first height; and a plurality of modular crew cabins interchangeably installable in either the first space or the second space. Each modular crew cabin comprises four walls forming sides of the modular crew cabin; a floor coupled to a portion of at least one of the four walls to form a bottom of the modular crew cabin; a lower bunk adjacent to a first wall of the four walls, the lower bunk having a major axis parallel to the first wall; an upper bunk adjacent to a second wall of the four walls, the upper bunk being partially disposed above the lower bunk and having a major axis perpendicular to the major axis of the lower bunk such that the lower bunk and the upper bunk are in an L-shaped configuration; and a ceiling coupled to a portion of at least one of the four walls to form a top of the modular crew cabin. The ceiling comprises a pop-up portion disposed above at least a portion of the second bunk at a first ceiling height relative to the floor; and a lower portion adjacent to the pop-up portion and covering a remainder of the crew cabin at a second ceiling height less than the first ceiling height relative to the floor.

In some embodiments, the first ceiling height is between 85 millimeters and 115 millimeters greater than the second ceiling height. In some embodiments, the second ceiling height is about 2.1 meters. In some embodiments, the first ceiling height is between about 2.185 meters and about 2.215 meters. In some embodiments, each modular crew cabin further comprises a storage volume disposed below a portion of the upper bunk and adjacent to a portion of the lower bunk. In some embodiments, the storage volume has an interior volume of at least 1 cubic meter. In some embodiments, each modular crew cabin further comprises a staircase for accessing the upper bunk, the staircase disposed adjacent to a third wall of the four walls opposite the first wall. In some embodiments, each modular crew cabin further comprises at least one storage volume disposed within the staircase. In some embodiments, each modular crew cabin further comprises connections for bathroom facilities and a desk, the first length is less than or equal to 4 meters, the first width is less than or equal to 2.1 meters, the first height is less than or equal to 2.3 meters, and each modular crew cabin includes at least partially enclosed storage volumes having a combined volume of greater than 1 cubic meter. In some embodiments, at least a portion of each of the lower bunk and the upper bunk has an interior height of greater than 1 meter. In some embodiments, the modular crew cabin system further comprises one or more utility conduits disposed within a space having a lower boundary defined by the lower portion of the ceiling and an upper boundary defined by the first ceiling height relative to the floor.

In a second aspect, a crew cabin module installable within a deck of a ship comprises four walls forming sides of the crew cabin module; a floor coupled to a portion of at least one of the four walls to form a bottom of the crew cabin module; a lower bunk adjacent to a first wall of the four walls, the lower bunk having a major axis parallel to the first wall; an upper bunk adjacent to a second wall of the four walls, the upper bunk being partially disposed above the lower bunk and having a major axis perpendicular to the major axis of the lower bunk such that the lower bunk and the upper bunk are in an L-shaped configuration; and a ceiling coupled to a portion of at least one of the four walls to form a top of the crew cabin module. The ceiling comprises a pop-up portion disposed above at least a portion of the second bunk at a pop-up ceiling height of greater than about 2.1 meters relative to the floor; and a lower portion adjacent to the pop-up portion and covering a remainder of the crew cabin at a lower ceiling height of about 2.1 meters relative to the floor.

In some embodiments, the pop-up ceiling height is at least about 2.185 meters. In some embodiments, the pop-up ceiling height is between about 2.185 meters and about 2.215 meters. In some embodiments, the crew cabin module further comprises a storage volume disposed below a portion of the upper bunk and adjacent to a portion of the lower bunk. In some embodiments, the storage volume comprises a clothing rack slidable between a first position within the storage volume and a second position substantially outside of the storage volume. In some embodiments, the crew cabin module further comprises a staircase for accessing the upper bunk, the staircase disposed adjacent to a third wall of the four walls opposite the first wall. In some embodiments, the crew cabin module further comprises at least one storage volume disposed within the staircase. In some embodiments, at least a portion of each of the lower bunk and the upper bunk has an interior height of greater than 1 meter. In some embodiments, the crew cabin module further comprises a bathroom and a desk; the crew cabin module fits within a space having a length less than or equal to 4 meters, a width less than or equal to 2.1 meters, and a height less than or equal to 2.3 meters; and the crew cabin module includes at least partially enclosed storage volumes having a combined volume of greater than 1 cubic meter.

BRIEF DESCRIPTION OF THE DRAWINGS

The disclosed aspects will hereinafter be described in conjunction with the appended drawings and appendices, provided to illustrate and not to limit the disclosed aspects, wherein like designations denote like elements.

DETAILED DESCRIPTION

Figure 1A:
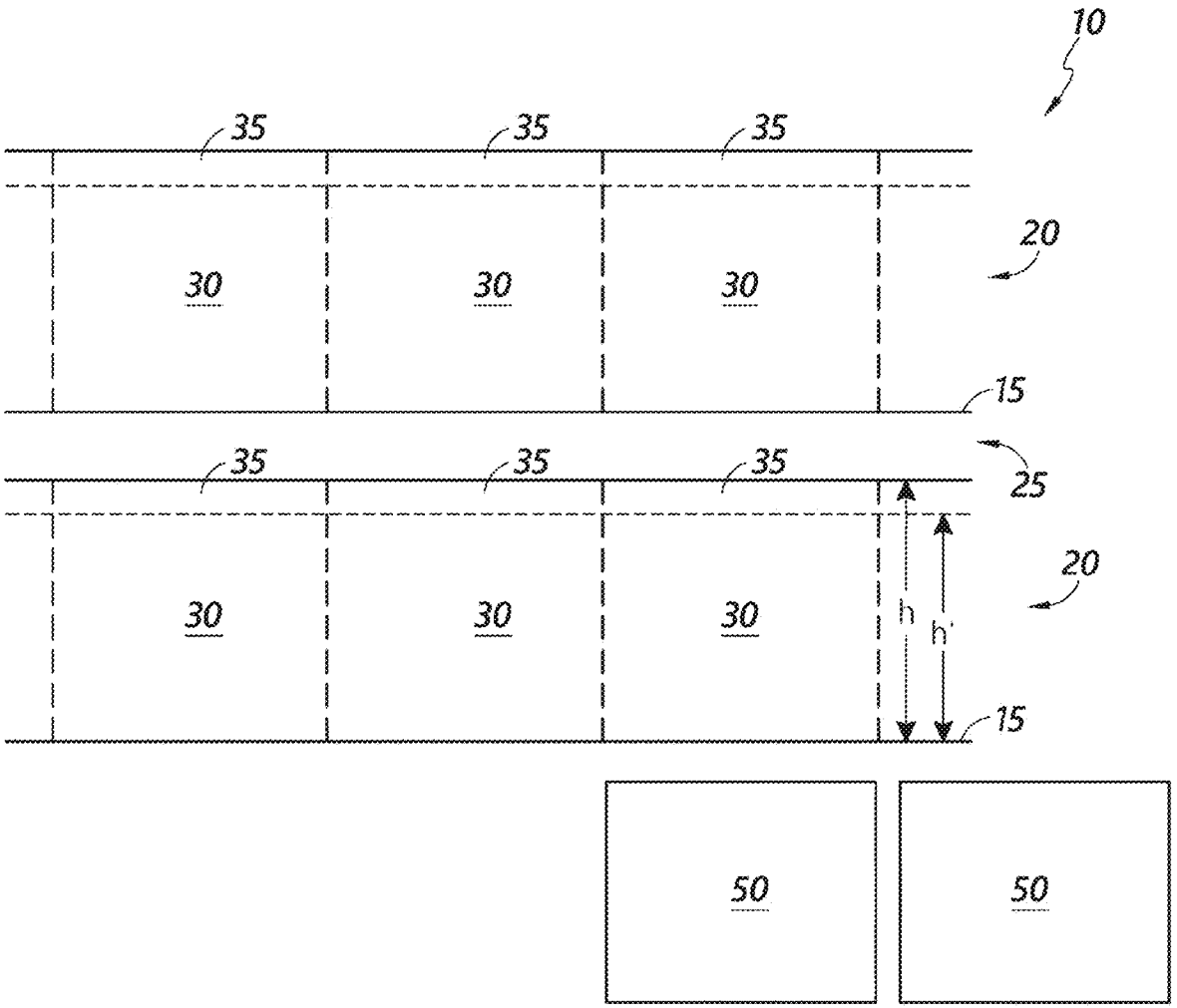
FIG. 1A is an interior cross-sectional side view schematically illustrating an example modular crew cabin system in accordance with the present technology.

Cruise ships include private or shared sleeping accommodations in the form of staterooms and/or cabins for all passengers and crew. Some vessels may be equipped to carry hundreds or thousands of passengers at a time. The number of crew members may be as high as 30%, 40%, or 50% of the number of passengers, or more. Thus, in addition to a large number of staterooms for passengers, cruise ships typically include numerous crew cabins to provide sleeping accommodations for hundreds or thousands of crew members. Crew cabins are usually multiple-occupancy cabins which may be located in interior areas and/or on lower decks of a ship, and are generally smaller and less luxurious relative to passenger staterooms. However, it is still desirable to provide crew members with comfortable sleeping accommodations in order to promote the health, happiness, and morale of the crew members.

Various cabins, including crew cabins and some staterooms, can be prefabricated, modular cabins that can be manufactured on land as self-contained cabin modules and subsequently installed within a deck of a cruise ship during initial construction, renovation, or retrofit. Certain standard sizes are commonly utilized within the industry for manufacturing efficiency. For example, crew cabin modules are typically built to fit within maximum dimensions of 4 meters in length×2.07 meters in width×2.2 meters in height. In another example, crew cabin modules can be constrained by a maximum internal volume (such as an industry-standard maximum volume of 17.388 cubic meters), rather than being constrained by maximum length, width, and height dimensions. Such modules can then be installed within spaces sized and shaped to accommodate this standard module size. This typically leaves about 100-150 millimeters of free space above each cabin module (along a height dimension) for the routing of utility conduits, such as electrical wiring, air ducts, water pipes, and the like.

Given the constraints associated with these industry-standard dimensions and/or volumes for a crew cabin, it is challenging to provide comfortable accommodations for two crew members. For example, a crew cabin typically must include individual bunks for each crew member, bathroom facilities (for example, a head, a sink, and/or a shower) or a portion of a shared bathroom, and sufficient storage space for each crew member's belongings (e.g., clothing, shoes, luggage, recreational items, etc.). Although crew members may spend much of their private time in common areas provided for crew recreation or sleeping, crew members may also wish to spend some private or semi-private time in their cabins. Thus, it may also be desirable or required to provide further amenities such as a desk, a chair or other sitting area, storage for personal food or beverage items, televisions, etc. Providing all of these features can be difficult within the confines of the industry-standard crew cabin volume. Existing crew cabins address these space constraints by providing very little storage space and/or by providing small stacked bunks whose interior vertical dimensions are insufficient for activities other than sleeping.

Accordingly, embodiments of the present technology provide novel crew cabin configurations that optimize efficient use of the space within an industry-standard crew cabin volume. For example, it has conventionally been impossible to have both upper and lower bunks in a two-person crew cabin configured such that both crew members can maintain an upright sitting position in their respective bunks, while still conforming to the industry-standard 2.1 meter height limit. In some embodiments, the crew cabins disclosed herein can include two bunks in an L-shaped configuration that provides enough vertical clearance in each bunk for a person up to 6 feet tall to comfortably sit up in the bunk. Embodiments of the present technology thus allow both crew members to sit upright in their bunks during commonly-desired recreation activities, such as watching television, using mobile devices, and reading, activities that could previously only be performed while lying down in the bunk. The L-shaped configuration allows at least a portion of a lower bunk to not be located beneath an upper bunk. A pop-up section of the ceiling located above the upper bunk (e.g., a section having a height as little as 85-115 millimeters higher than the remainder of the ceiling) has been found to advantageously accommodate a person in an upright sitting position in the bunk, while still leaving enough room for the routing of the necessary utility conduits above the remainder of the ceiling. Moreover, the improved cabin configurations disclosed herein can provide each of the amenities described above while also providing a relatively large volume of enclosed or semi-enclosed storage space. For example, some embodiments include over one cubic meter of storage space that is at least partially enclosed such that items stored therein do not clutter the remaining interior space of the cabin.

Although embodiments of the modular cabins and modular cabin systems described herein are described in the context of crew cabins for cruise ships, it will be understood that the present technology is not limited to this class of accommodations, this type of service provider, or the particular cruise context. Embodiments of the present technology can be implemented, as non-limiting examples, in cargo, merchant marine, and military vessels. As will be described in detail below, features of the present technology can be employed in many other contexts, such as but not limited to entertainment, hotel, and other hospitality services. The present technology can be implemented in any system where it is desirable to provide sleeping accommodations that make efficient use of a limited amount of available space.

Figure 1B:
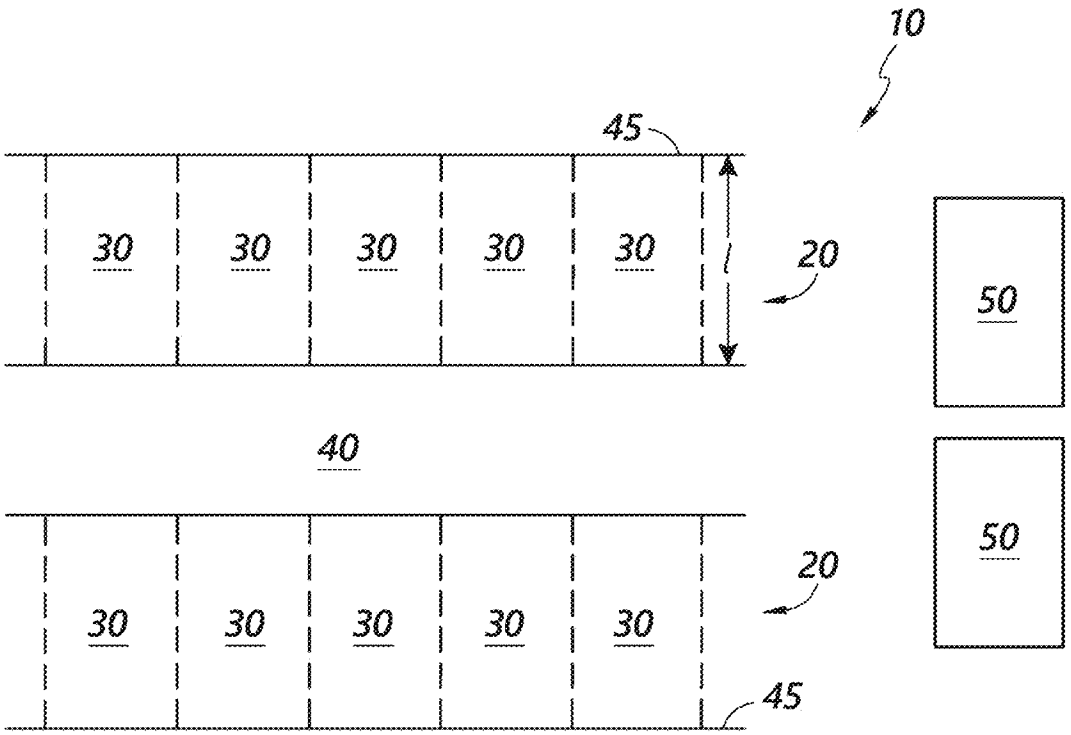
FIG. 1B is a top view schematically illustrating the example modular crew cabin system of FIG. 1A.

Referring now to the drawings, FIGS. 1A and 1B schematically illustrate a portion of an interior of a ship configured with an example modular crew cabin system 10 according to the present technology. FIG. 1A is an interior side view showing portions of two decks 15 of the ship. FIG. 1B is a top plan view showing a single deck 15 of FIG. 1A. One or more decks 15 may be spaced vertically within a ship, such as a cruise ship or the like. Each deck 15 supports one or more rows 20 of spaces 30 in which interchangeable modules 50, such as crew cabin modules or other modules, may be installed. A structural space 25 between each deck 15 and the spaces 30 of the deck 15 below may be provided, such as to accommodate deck support structures and/or utility conduits such as wires, pipes, or the like. Within an individual deck 15, as shown in FIG. 1B, each row 20 of spaces 30 may be located adjacent to a passageway 40 to permit crew or passengers to access cabin modules installed within the spaces 30, and may be bounded by a bulkhead 45. Other configurations are possible.

Each space 30 is generally defined by a length l, a width w, and a height h. A ship may include a plurality of spaces 30 of a particular length l, width w, and height h, such that multiple interchangeable cabin modules 50, such as crew cabin modules, can be installed within the spaces 30. An upper portion of each space 30 may be reserved as a utility space 35 to allow space for utilities to be routed to the cabin module 50 installed therein, leaving a smaller height h' which may be occupied by the cabin module 50. The width w of spaces 30 may be defined at least in part by physical structures located at the boundaries between adjacent spaces 30, or may not correspond to any physical boundaries.

In some implementations of the present technology, one or more industry standards and/or cost considerations may dictate one or more dimensions of the spaces 30. For example, in some embodiments the spaces 30 may constrain each cabin module 50 to a maximum width w of 2.2 meters and a maximum length l of 4 meters, and a maximum cabin module height h' of 2.1 meters. The spaces 30 may have a larger full height h of, for example, 2.3 meters or more, with a predetermined space (e.g., a difference D between h and h') reserved for routing of utility conduits. In some implementations, one or more industry standards and/or cost considerations may dictate a maximum total volume for a space 30. For example, the maximum total volume of a space 30 may be approximately 17.64 cubic meters, corresponding to a length l, width w, and cabin module height h' of 4 meters, 2.2 meters, and 2.1 meters, respectively. Other example maximum dimensions may include, for example, a length l of 4.126 meters×a width w of 2.12 meters, a length l of 3.676 meters×a width w of 2.4 meters, or any other industry-defined or industry-standard dimensions.

Within such industry-standard sizes, it has traditionally been difficult to design a cabin module such as a crew cabin that provides comfortable living and sleeping quarters for two or more crew members. Consequently, crew cabins that conform to these industry standards typically include cramped bunk space, insufficient storage space, and little living space such that existing crew cabins are typically ill-suited for activities other than sleeping. For example, due to conventional height requirements, bunks are typically stacked such that there is not enough space for each crew member to sit up within their bunk (e.g., for activities such as reading, watching media, or the like).

Figure 2:
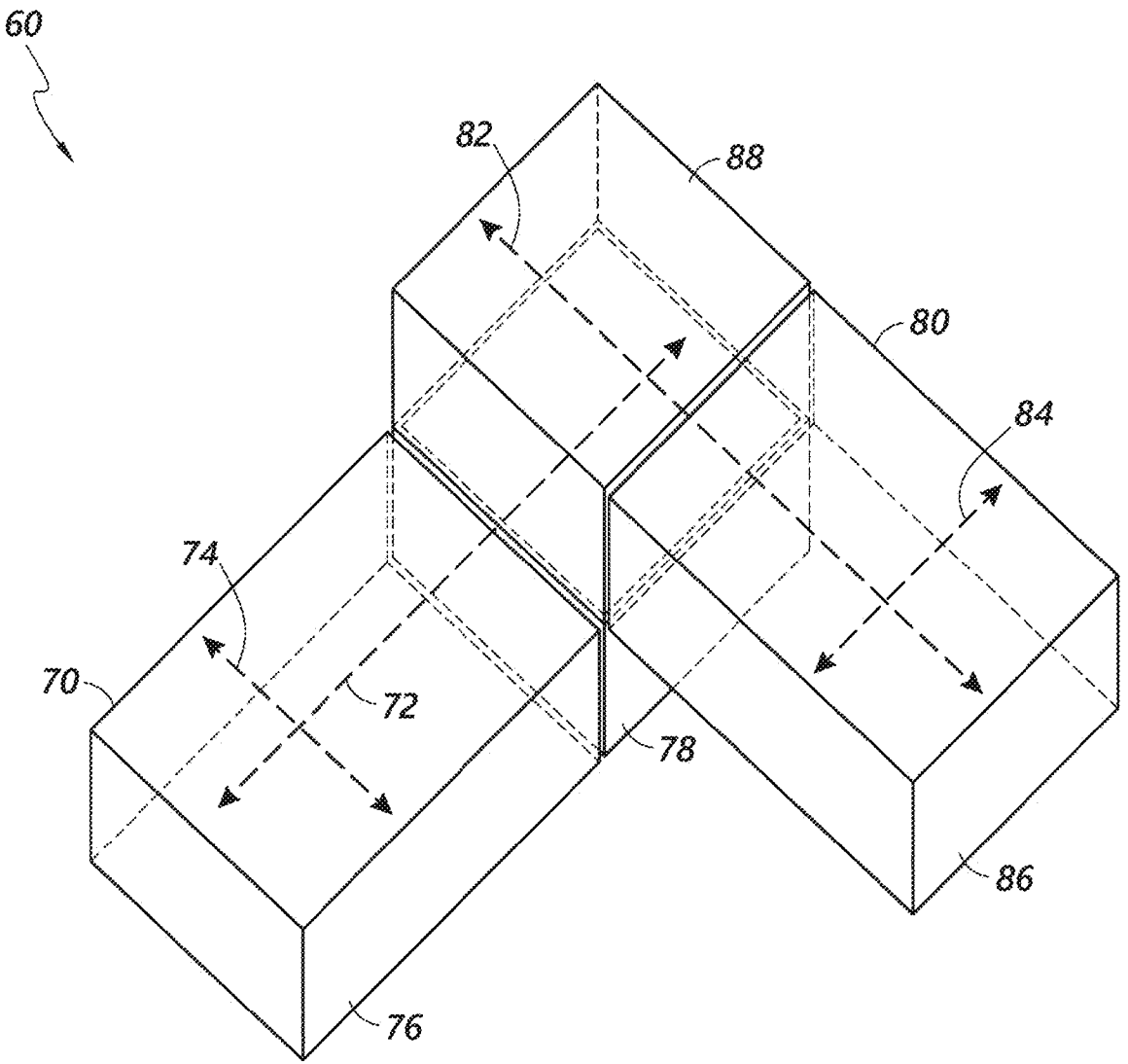
FIG. 2 is a perspective view schematically illustrating an L-shaped bunk configuration in accordance with the present technology.

In some embodiments, one or more of these drawbacks may be mitigated by the use of an L-shaped bunk configuration within a cabin module. FIG. 2 schematically depicts an L-shaped bunk configuration 60 in accordance with the present technology. The L-shaped bunk configuration 60 includes a lower bunk 70 and an upper bunk 80.

The lower bunk 70 is generally defined by a major axis 72 (e.g., the "length" of the lower bunk 70, or the axis along which an occupant generally aligns his/her body while lying prone or supine within the bunk) and a minor axis 74 perpendicular to the major axis 72. The minor axis 74 corresponds to the "width" of the lower bunk 70. The lower bunk 70 includes a non-overlapping section 76, which is not disposed beneath any portion of the upper bunk 80, and an overlapping section 78, which is disposed beneath a portion of the upper bunk 80.

The upper bunk 80 similarly is generally defined by a major axis 82 (e.g., the "length" of the upper bunk 80, or the axis along which an occupant generally aligns his/her body while lying prone or supine within the bunk) and a minor axis 84 perpendicular to the major axis 82. The minor axis 82 corresponds to the "width" of the upper bunk 80. The upper bunk 80 includes a non-overlapping section 86, which is not disposed above any portion of the lower bunk 70, and an overlapping section 88, which is disposed above the overlapping portion 78 of the lower bunk 70.

As will be described in greater detail below, when the L-shaped bunk configuration 60 is incorporated within a cabin module, it may optionally be implemented such that the lower bunk 70 is directly adjacent to a first wall of the cabin module (e.g., with its major axis 72 disposed parallel to the first wall) and the upper bunk 80 is directly adjacent to a second wall of the cabin module that meets the first wall at an angle (e.g., with its major axis 82 disposed parallel to the second wall). In such example implementations, the overlapping section 78 of the lower bunk 70 and the overlapping section 88 of the upper bunk 80 each lie adjacent to both the first wall and the second wall. Example cabin module configurations in accordance with the L-shaped configuration 60 will now be described in greater detail.

Figure 3:
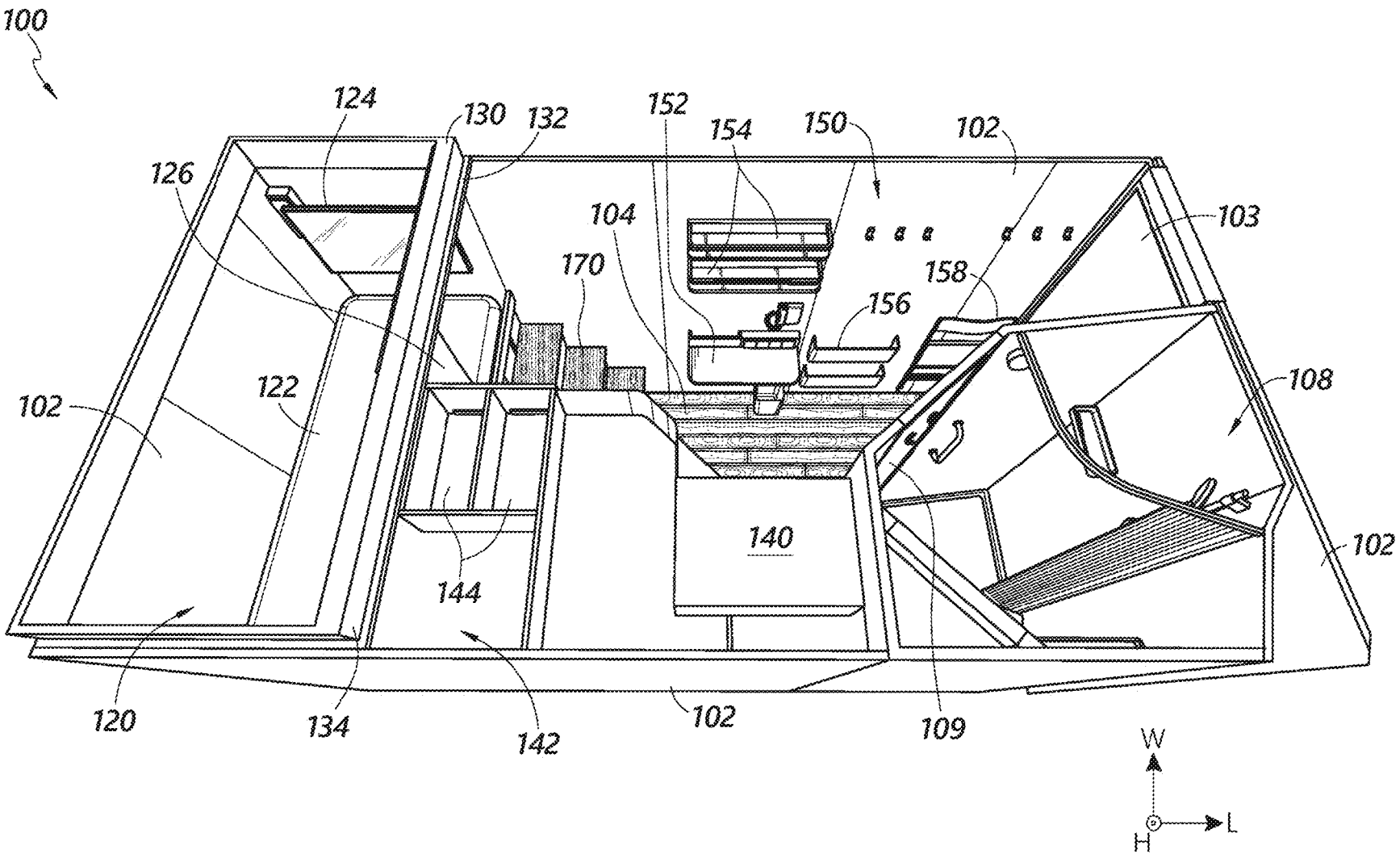
FIG. 3 is an upper left side perspective cutaway view of an example crew cabin module in accordance with the present technology.
Figure 4:
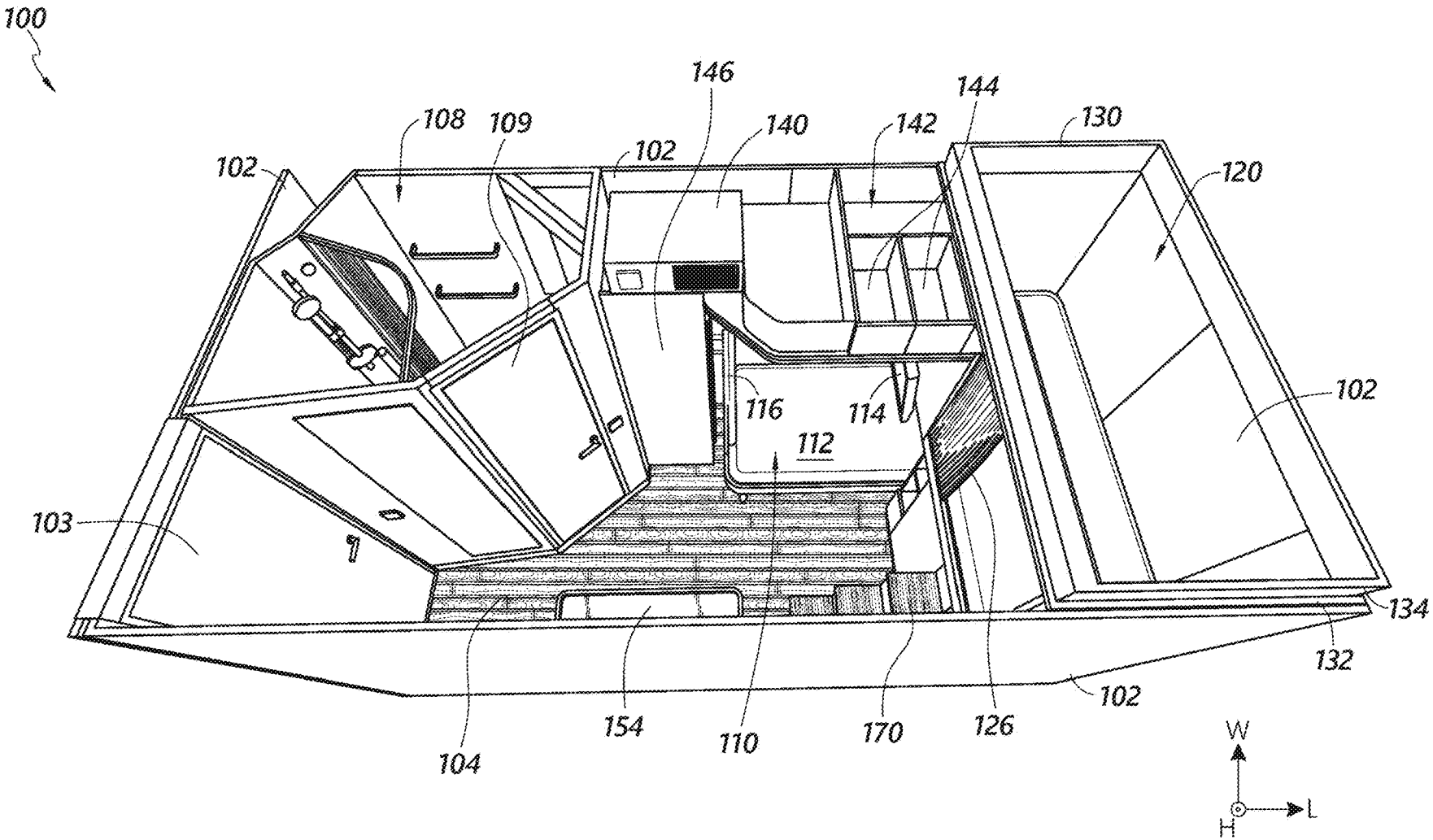
FIG. 4 is an upper right side perspective cutaway view of the example crew cabin module of FIG. 3.
Figure 5:
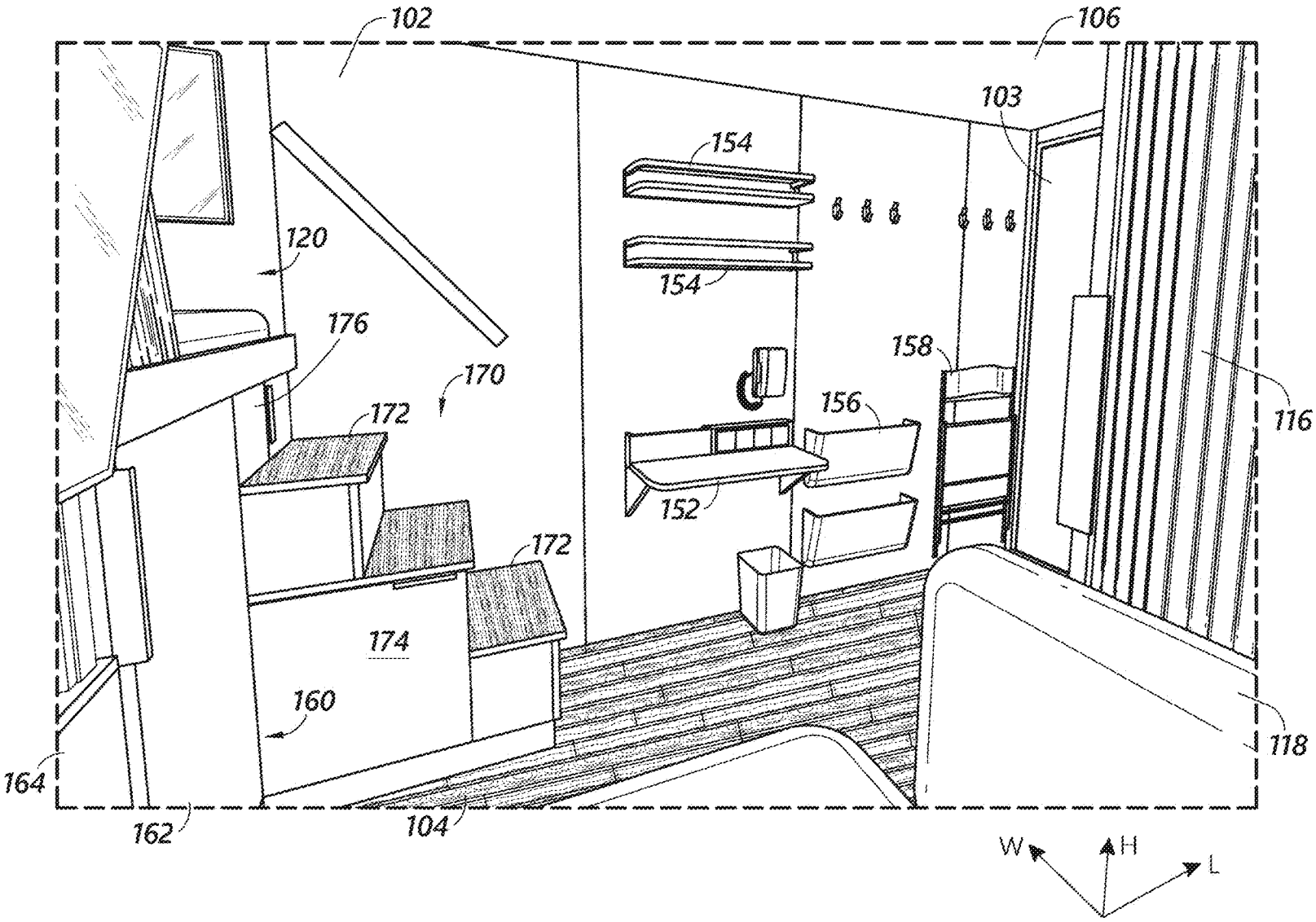
FIG. 5 is an interior perspective view taken from a lower bunk of the example crew cabin module of FIGS. 3 and 4.
Figure 6:
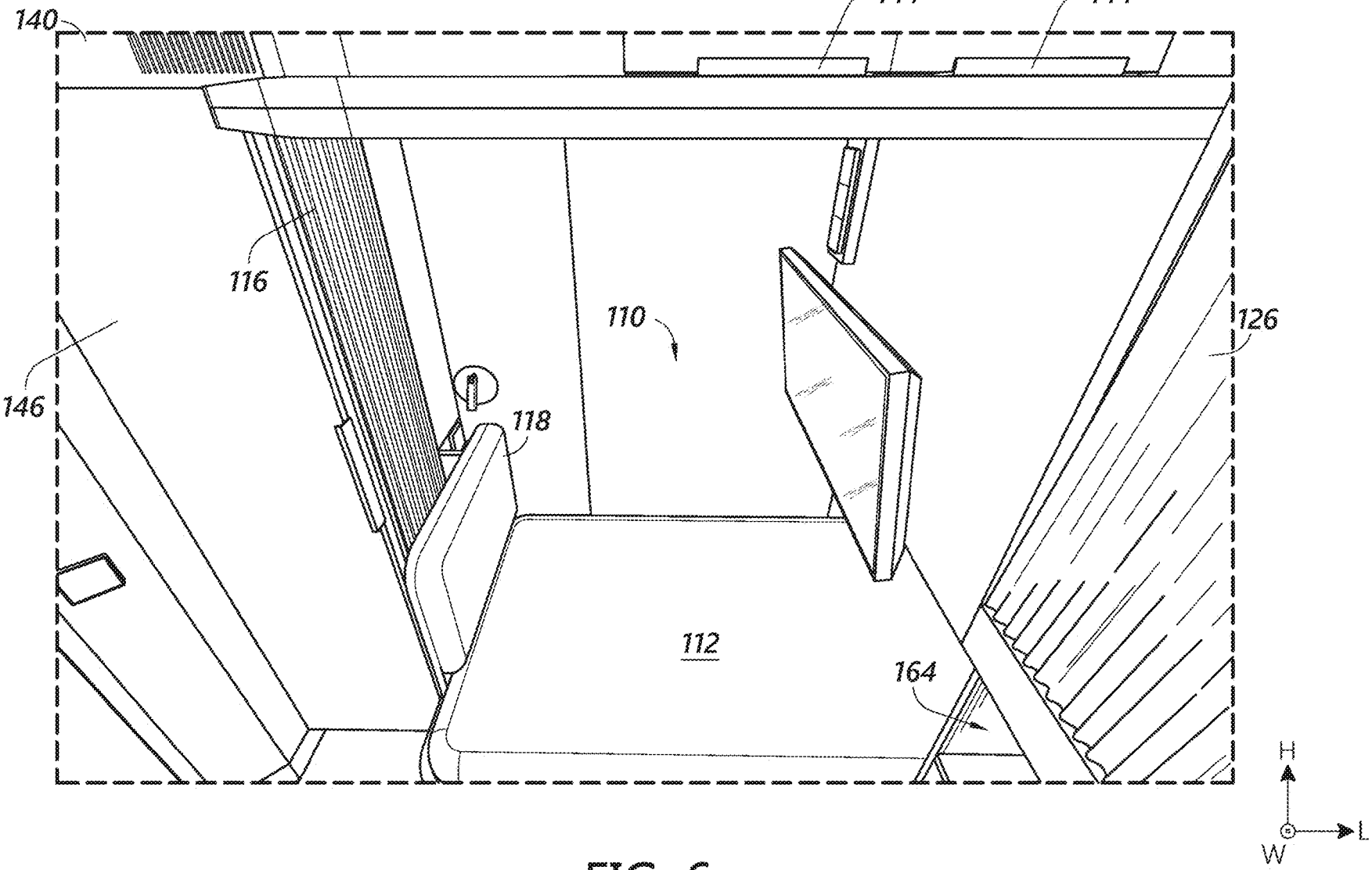
FIG. 6 is an interior perspective view of the lower bunk of the example crew cabin module of FIGS. 3-5.

FIGS. 3-6 depict perspective views of a crew cabin module 100 in accordance with the present technology, which overcomes many of the shortcomings of conventional crew cabins while still being installable within the industry-standard crew cabin spaces in a modular crew cabin system. FIG. 3 is an upper left side perspective cutaway view of the crew cabin module 100. FIG. 4 is an upper right side perspective cutaway view of the crew cabin module 100. In FIGS. 3 and 4, portions of the ceiling are cut away to show the interior components of the crew cabin module 100. FIGS. 5 and 6 are interior perspective views of the crew cabin module 100.

With reference jointly to FIGS. 3-6, the crew cabin module 100 includes four walls 102 spaced to form sides of the crew cabin module 100. The crew cabin module 100 includes a floor 104, which can be connected to a bottom edge of at least one of the four walls 102. The crew cabin module 100 also includes a ceiling 106, which can be connected to a top edge of at least one of the four walls 102. As will be described in greater detail, a portion of the ceiling 106 may include an extended ceiling section 130. A door 103 provides access between the interior of the crew cabin module 100 and a passageway or other space outside the crew cabin module 100. A portion of the interior of the crew cabin module 100 may be divided as a bathroom 108 including a bathroom door 109 for access between the bathroom 108 and the remainder of the interior of the crew cabin module 100.

The example crew cabin module 100 is a double-occupancy module including a lower bunk 110 and an upper bunk 120. In contrast to conventional multiple-occupancy configurations, the lower bunk 110 and the upper bunk 120 are disposed perpendicularly in an L-shaped configuration. As will be described in greater detail, the L-shaped configuration allows for substantially improved comfort and storage space relative to existing cabin designs.

The lower bunk 110 is sized and shaped to accommodate a mattress 112 which provides a sleeping surface for one of the occupants of the crew cabin module 100. Additional optional features of the lower bunk 110 include an audio/visual (A/V) display 114, a curtain 116, and a bed cushion 118. The A/V display 114 is positioned and/or tilted such that an occupant can comfortably view the A/V display 114 from a supine, semi-supine, or sitting position on the mattress 112. In the sitting position, the bed cushion 118 can be used as a back rest. The curtain 116 may be slidably mounted on a track allowing the curtain 116 to be closed around a perimeter of the lower bunk 110 to provide privacy and/or darkness for an occupant within the lower bunk 110.

Similarly, the upper bunk 120 is sized and shaped to accommodate a mattress 122 which provides a sleeping surface for an occupant of the crew cabin module 100. Additional optional features of the upper bunk 120 include an A/V display 124 and a curtain 126. The A/V display 124 is positioned and/or tilted such that an occupant can comfortably view the A/V display 124 from a supine, semi-supine, or sitting position on the mattress 122. Because the upper bunk 120 occupies substantially the full width of the example crew cabin module 100, one of the walls 102 may be used as a back rest in a sitting position. In some embodiments, a bed cushion similar to the bed cushion 118 may be provided within the upper bunk 120 (e.g., adjacent to the wall 102 opposite the A/V display 124) to serve as a back rest. The curtain 125 may be slidably mounted on a track allowing the curtain 126 to be closed across the opening of the upper bunk 120 to provide privacy and/or darkness for an occupant within the upper bunk 120.

In some embodiments, the crew cabin module 100 is designed such that both the lower bunk 110 and the upper bunk 120 can accommodate an occupant having a height of 6 feet or more sitting upright within the bunk 110, 120 (e.g., entirely within the volume of the bunk 110, 120, without leaning outside of the bunk). Further, the lower bunk 110 and the upper bunk 120 can both allow a 6-foot-tall occupant to both lie down and sit up comfortably within either bunk 110, 120. It has been observed that human sitting height ratios typically vary between approximately 0.45 and 0.6 (e.g., a human's sitting height is typically between approximately 45% and 60% of standing height), such that a 6-foot-tall person can typically sit up comfortably within a space having a height of approximately 3.6 feet or about 1100 mm.

For the lower bunk 110, such comfort is accomplished by the L-shaped configuration, in which the major axes of the two bunks 110, 120 are perpendicular or substantially perpendicular. In the L-shaped configuration, approximately one half, slightly more than one half, or less than one half of the lower bunk 110 is an overlapping portion disposed below the upper bunk 120 by a distance suitable for accommodating the legs and/or lower torso of an occupant while in a recumbent, supine, prone, or side-facing lying position. The remainder of the lower bunk 110 is a non-overlapping portion which is not disposed below any portion of the upper bunk 120 due to the L-shaped configuration, and is reserved as available sitting space such that the occupant of the lower bunk 110 may sit up comfortably within this relatively taller non-overlapping space which has a greater interior height than that of the overlapping space.

In order to provide similar vertical accommodation for the upper bunk 120, in some embodiments an extended ceiling section 130 may be used. The extended ceiling section 130 includes a portion of the ceiling of the crew cabin module 100 and has a greater height relative to the remainder of the ceiling 106. The extended ceiling section 130 may be manufactured as a single component separate from the other portions of the crew cabin module 100 and may be attached to the crew cabin module 100 after manufacturing is substantially complete, for example, before or after the crew cabin module 100 is installed within a space 30 of a modular crew cabin system 10 (FIGS. 1-2) of a ship. Embodiments of the extended ceiling section 130 are described in further detail below with reference to FIGS. 16-20.

The extended ceiling section 130 (partially cut away in FIGS. 3 and 4) is supported by a lower flange 132 and sidewalls 134. The sidewalls 134 can be coupled to the extended ceiling section 130 and the lower flange 132. In other examples, the sidewalls 134 are integrally formed with the extended ceiling section 130. The lower flange 132 can be coupled to at least a portion of the upper edges of walls 102 and the remaining portion of the ceiling 106 of the crew cabin module 100 (not shown in this figure but shown in FIGS. 12, 14, 15, and 20). When coupled to the remainder of the crew cabin module 100, the extended ceiling section 130 provides a ceiling section that is relatively higher than the remainder of the ceiling 106 of the crew cabin module 100, such that the upper bunk 120 provides a space having a height similar to the height of the non-overlapping portion of the lower bunk 110 (e.g., a height of at least approximately 3.6 feet or about 1100 mm). Accordingly, both the lower bunk 110 and the upper bunk 120 of the example crew cabin module 100 can accommodate occupants having heights of up to 6 feet or more while allowing the occupants to sit comfortably within their bunks. These combined vertical dimensions have not been attainable in conventional crew cabin configurations within the industry-standard cabin dimensions, and are unexpectedly realizable using the novel cabin configurations of the present technology.

Embodiments of the crew cabin module 100 provide additional advantages over existing modular crew cabins. For example, an air conditioning unit 140 can be disposed, for example, above the lower bunk 110 to provide cooling and/or heating for the crew cabin module 100. In some embodiments, open space 142 may be used to provide a second air conditioning path directly into the upper bunk 120, for example, as it may otherwise be difficult to effectively cool or heat the interior portion of the upper bunk 120. Upper storage compartments 144 may be provided in the vicinity of the air conditioning unit 140. A wardrobe 146 may further be included within a space below the air conditioning unit 140 and between the lower bunk 110 and the bathroom 108.

The efficient layout of the crew cabin module 100 further provides space for a multi-use area 150, which may generally include open space and functional features such as a desk 152, shelves 154, and wall storage such as shoe baskets 156 and/or storage space for a chair 158 or other items such as coats or the like.

The L-shaped configuration of the lower bunk 110 and the upper bunk 120 provides further efficiency by allowing space for a relatively large primary storage area 160 disposed at least partially below the non-overlapping portion of the upper bunk 120, which does not overlie the lower bunk 110. The primary storage area 160 is enclosed by a wardrobe door 162 disposed between the lower bunk 110 and a staircase 170 provided for accessing the upper bunk 120. Further partially enclosed storage may be included as shelves 164 between the lower bunk 110 and the wardrobe door 162.

The staircase 170 may be a multifunctional staircase providing both access to the upper bunk 120 and further enclosed storage space in addition to the storage space below the upper bunk 120. For example, top-opening stair top compartments 172 may be provided within some of the stairs of the staircase 170. A side-opening staircase compartment 174 provides further enclosed storage space and in some embodiments may be sized to accommodate a small refrigerator within the staircase 170. A stair riser compartment 176 may be located below the top bunk 120 and in some embodiments may be sized to accommodate one or more safes. For example, two safes may be located within the stair riser compartment 176 to provide a private safe for each occupant.

FIGS. 7-19 illustrate various example dimensions of a crew cabin module such as the crew cabin module 100 of FIGS. 3-6. Each of the dimensions provided in FIGS. 7-19 is in millimeters unless labeled otherwise. Similar components to those illustrated in FIGS. 3-6 are labeled with similar reference numerals throughout FIGS. 7-19. Throughout the drawings, it will be understood that the illustrated dimensions of the various components of the crew cabin module 100 are provided as examples only, and various embodiments of cabin modules may have differing dimensions without departing from the spirit or scope of the present technology.

Figure 7:
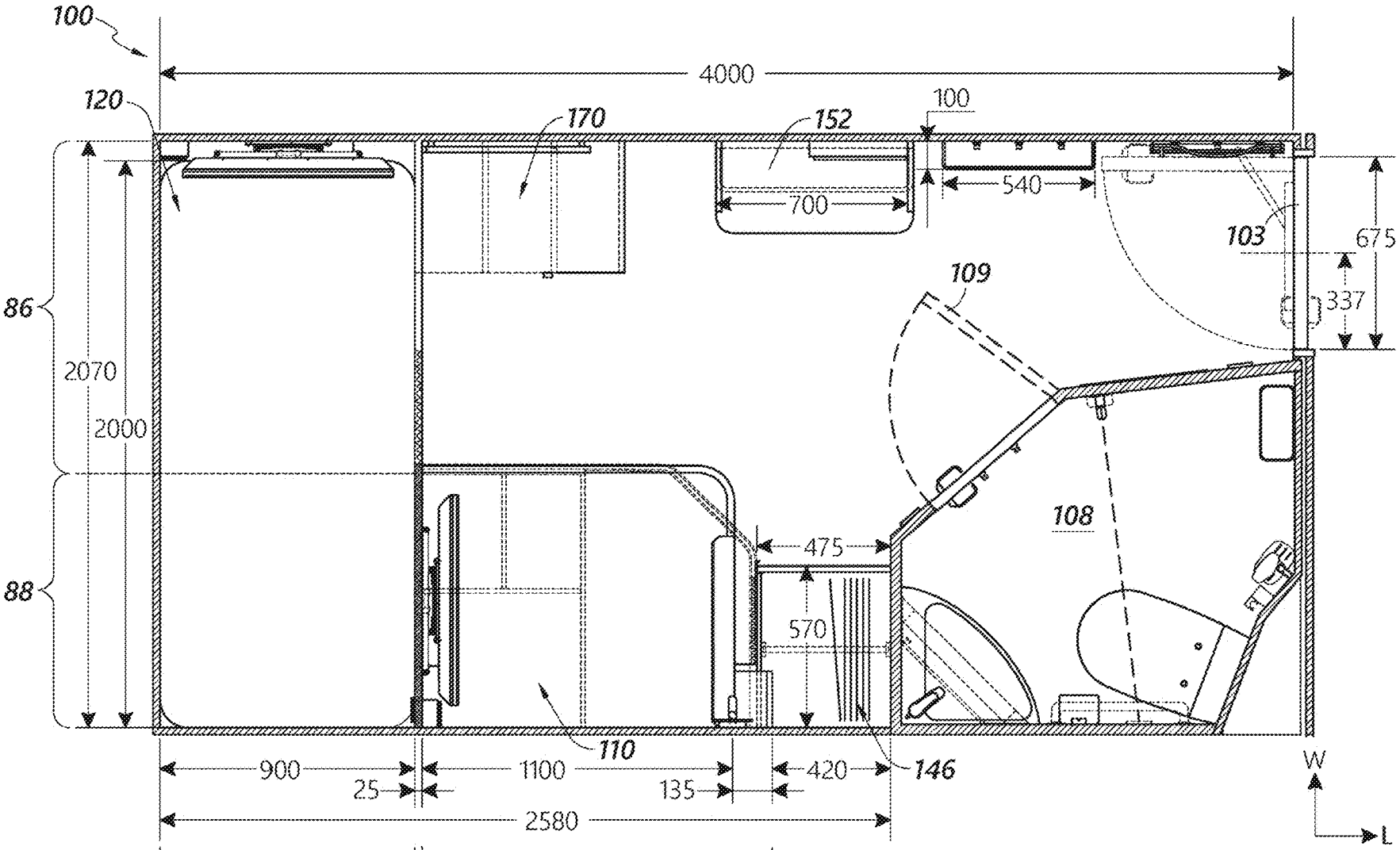
FIG. 7 is a top plan view of the example crew cabin module of FIGS. 3-6.

FIG. 7 is a top plan view illustrating example dimensions of the example crew cabin module 100. As shown in FIG. 7, the features described above with reference to FIGS. 3-6 can fit within a crew cabin module having a width of 2070 mm and a length of 4000 mm, thus being installable within an industry-standard modular cabin space having a width w of 2.2 meters and a length l of 4 meters, as described above with reference to FIGS. 1 and 2. In addition, within these dimensions, the crew cabin module 100 accommodates a lower bunk 110 and an upper bunk 120 each having a length of at least 2000 mm (about 6.5 feet) and a width of at least 900 mm (about 3 feet) so as to accommodate occupants of up to 6 feet or more in height sitting in the bunk.

Figure 8:
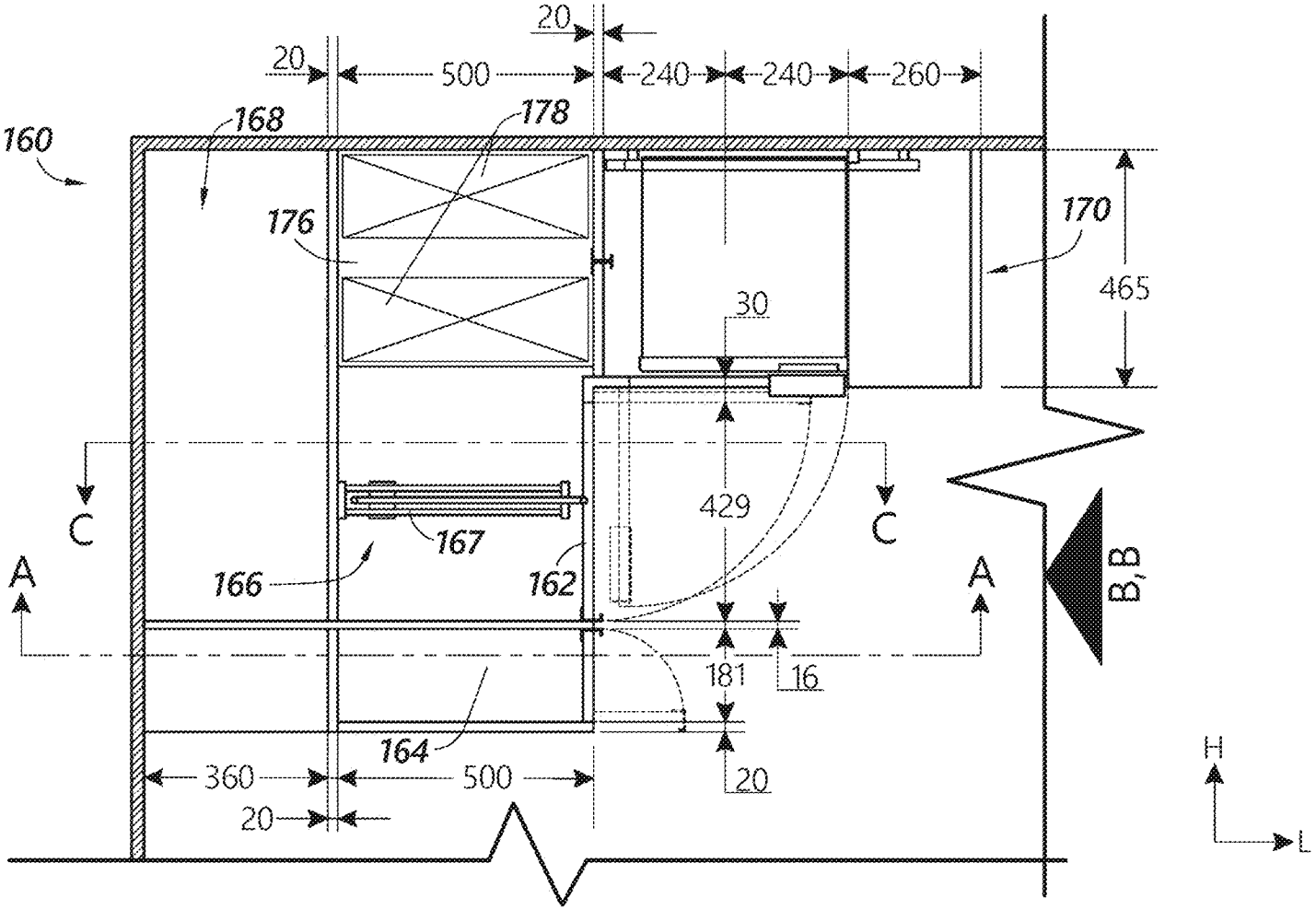
FIG. 8 is a partial top plan view illustrating interior storage volumes of the example crew cabin module of FIGS. 3-7.
Figure 9:
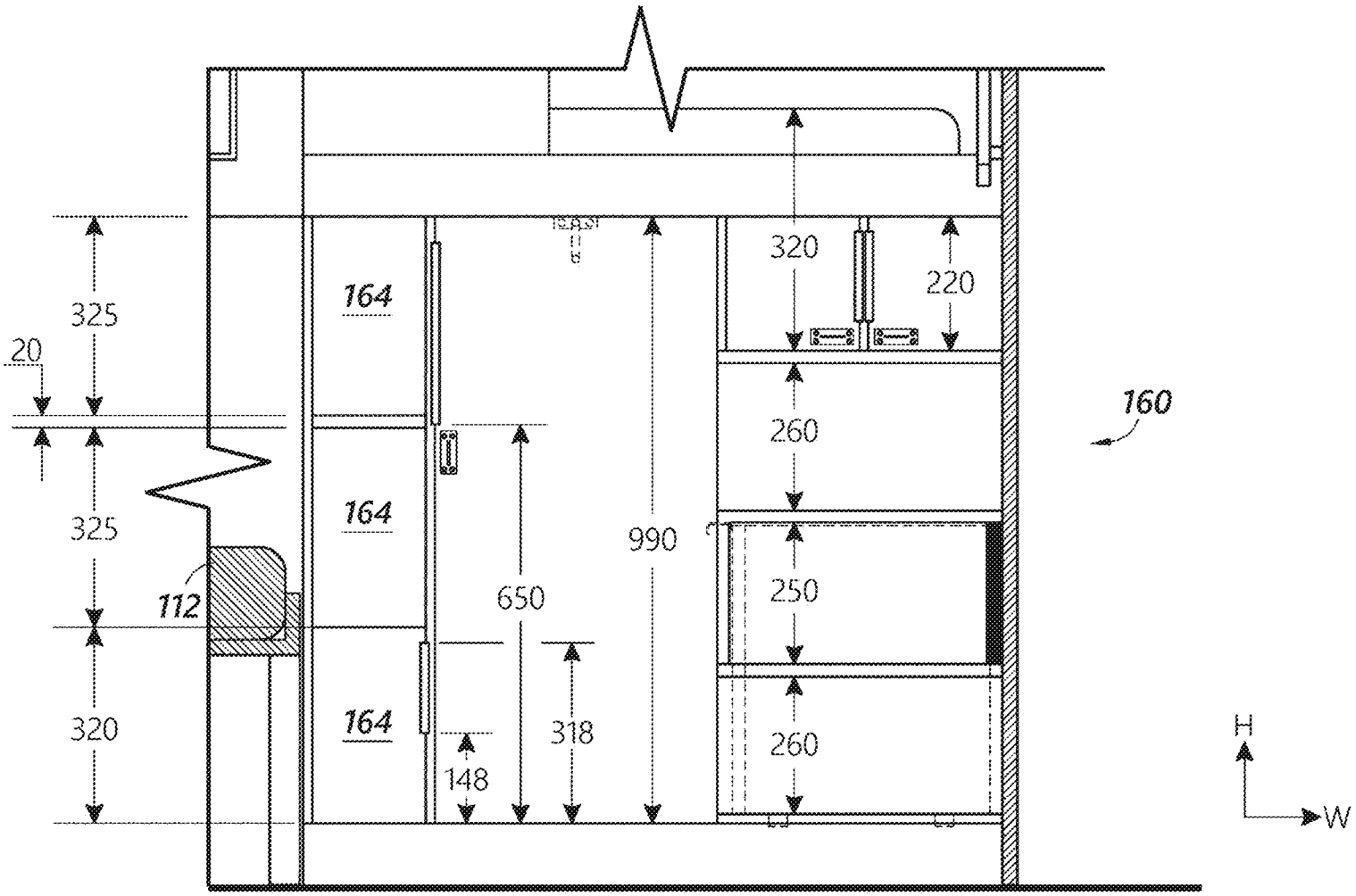
FIGS. 9-11 are cross-sectional elevation views of the interior storage volumes illustrated in FIG. 8.
Figure 10:
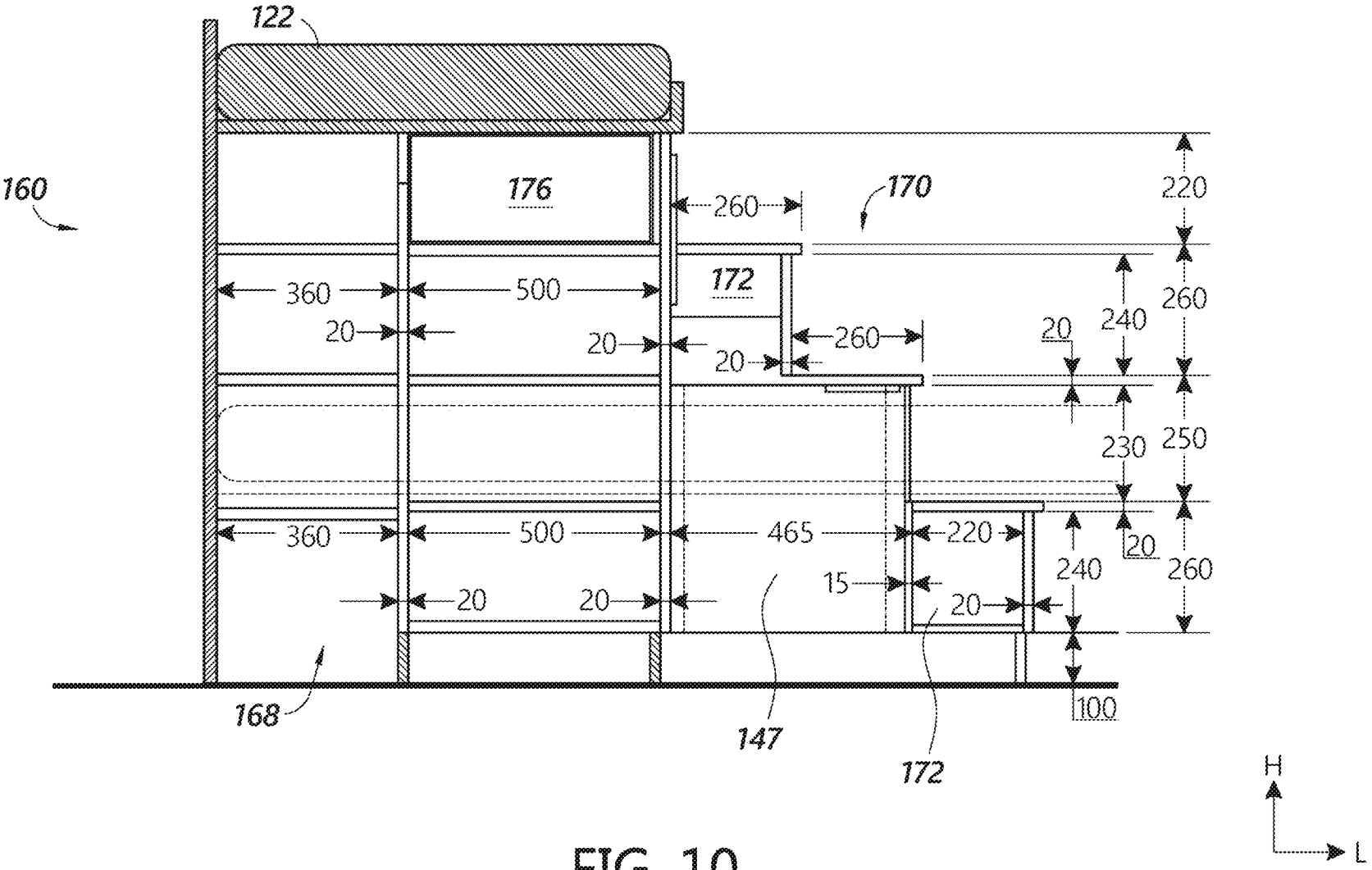
Figure 11:
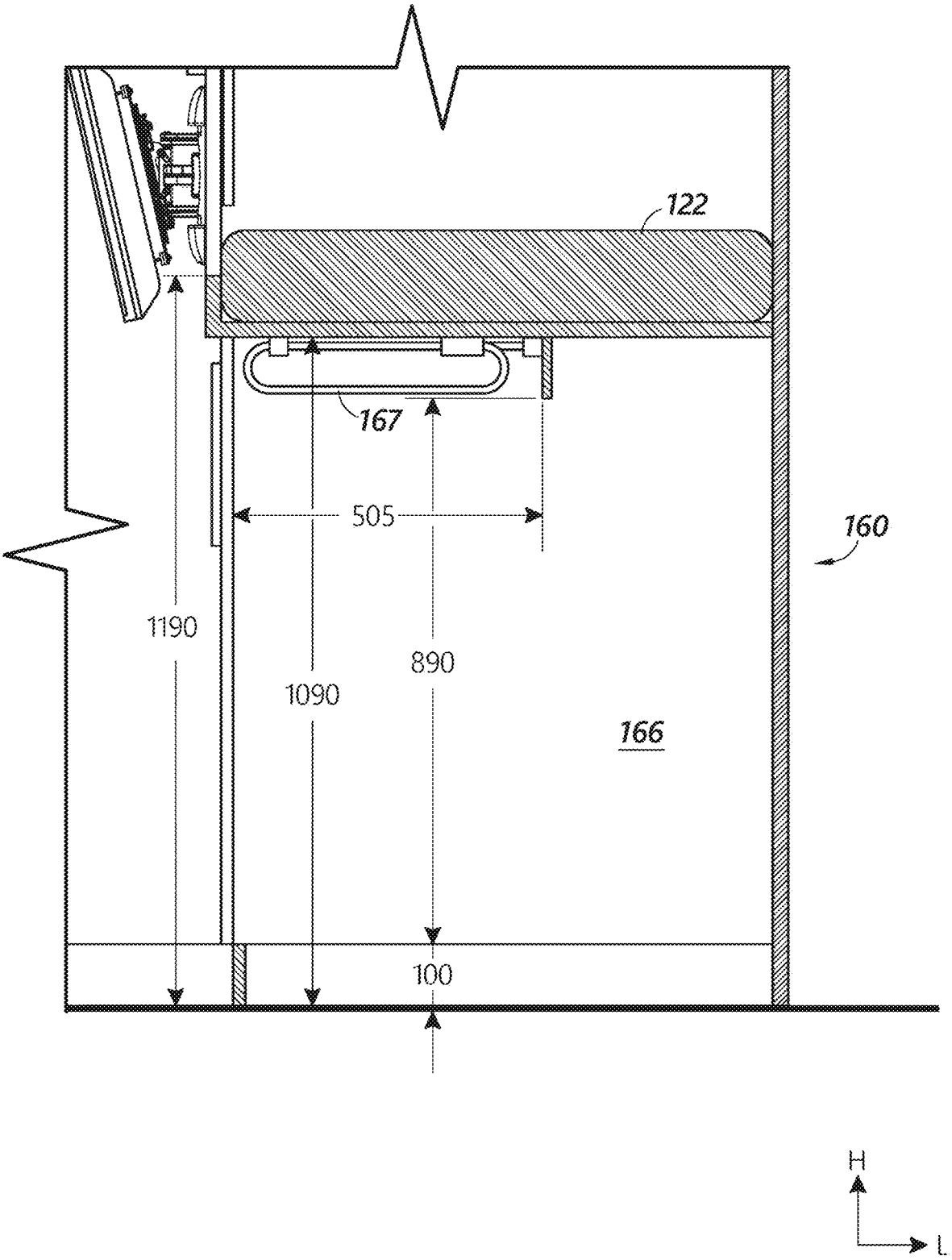

FIGS. 8-11 further illustrate interior dimensions of the primary storage area 160 and the storage volumes disposed within the staircase 170. FIG. 8 is a partial top plan view showing the primary storage area 160 and the staircase 170. FIG. 9 is a cross-sectional view of the primary storage area 160 taken about the line B-B in FIG. 8. FIG. 10 is a cross-sectional view of the primary storage area taken about the line A-A in FIG. 8. FIG. 11 is a cross-sectional view of the primary storage area taken about the line C-C in FIG. 8.

Referring jointly to FIGS. 8-11, the primary storage area 160 includes an outer portion 166 disposed adjacent to the wardrobe door 162 and an inner portion 168 disposed relatively further inward from the wardrobe door 162. In some embodiments, it may be relatively easier to access the outer portion 166 than to access the inner portion 168. The inner portion 168 may be sized and shaped to accommodate a plurality of suitcases. The relatively large amount of storage space within the crew cabin module enables the occupants to store their suitcases on a long-term basis within the inner portion 168 of the primary storage area 160 while storing their clothing and other belongings in the other (more readily accessible) portions of the primary storage area 160 and/or the other storage volumes of the crew cabin module 100. Accordingly, the efficient configuration of the crew cabin module 100 prevents the occupants from having to access or move their suitcases out of the way on a day-to-day basis, as may be required with other cabin configurations that have a smaller storage volume.

The outer portion 166 of the primary storage area 160 may include a slidable wardrobe rack 167 that provides hanging storage for clothing within the outer portion 166. While the wardrobe door 162 is open, the wardrobe rack 167 can slide out of the primary storage area 160 to provide convenient access to the hanging clothes stored on the wardrobe rack 167. As shown by the various dimensions illustrated in FIGS. 8-11, in some embodiments the primary storage area 160 has a volume of at least 1 cubic meter, alone or in combination with the shelves 164 and/or the storage volumes located within the staircase 170 (e.g., top-opening stair compartments 172, side-opening staircase compartment 174, and stair riser compartment 176 which may include safes 178 therein).

Figure 12:
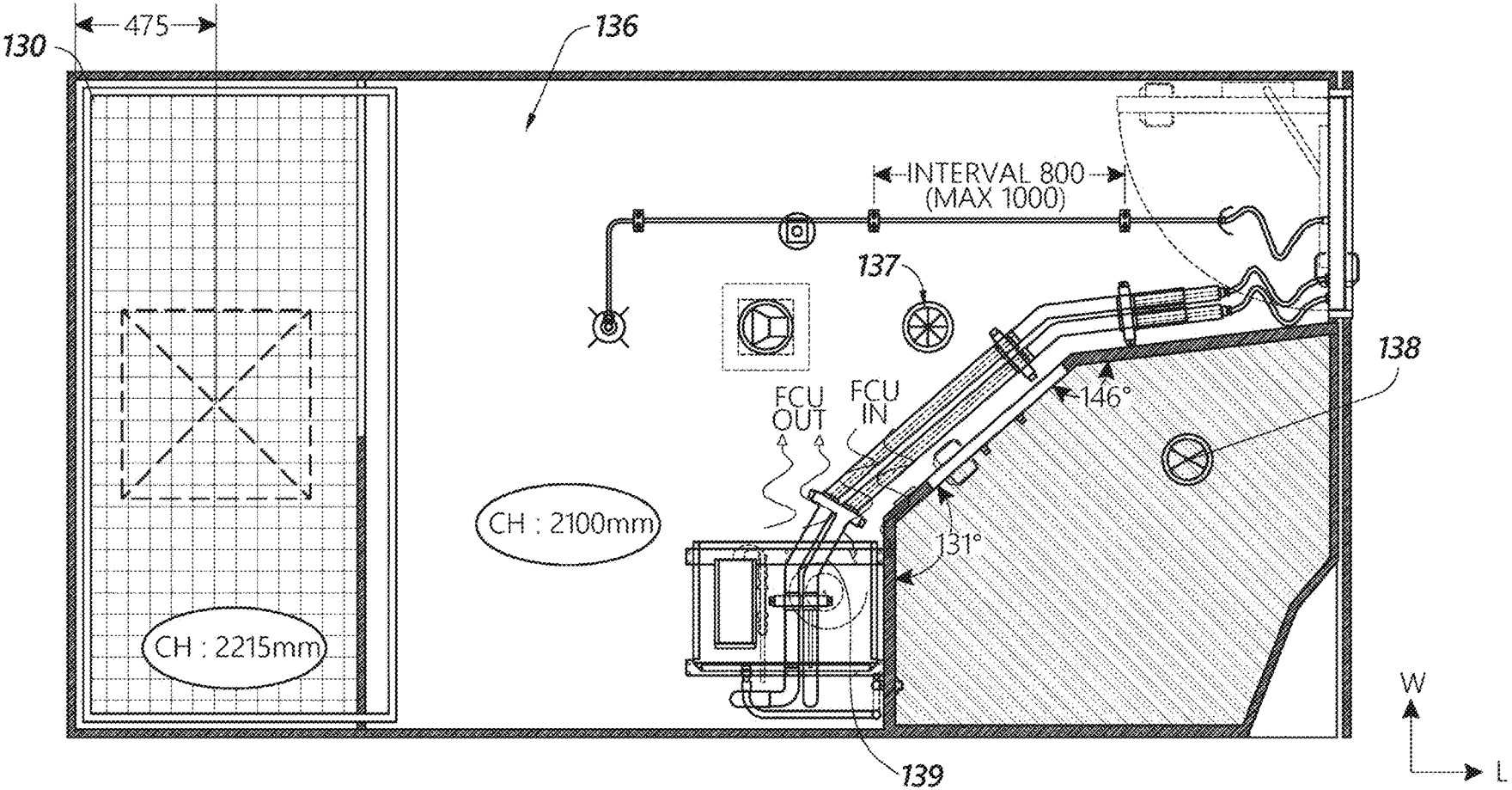
FIG. 12 is a top plan view of the example crew cabin module of FIGS. 3-11 illustrating example utility conduit locations.

FIG. 12 is a top plan view of the example crew cabin module 100 illustrating example utility conduit locations. As shown in FIG. 12, the extended ceiling section 130 occupies a portion of the top of the crew cabin module 100 (e.g., the portion overlying the upper bunk 120), while the remainder 136 of the ceiling of the crew cabin module 100 is at a lower height relative to the top of the extended ceiling portion 130 (e.g., at the conventional cabin module ceiling height of 2.1 meters). As shown in the top plan view of FIG. 12, the remainder 136 of the ceiling of the crew cabin module 100 is still large enough to accommodate various utility conduits. For example, an air supply conduit (not shown) may be routed over the remainder 136 of the ceiling to connect to a cabin air intake 137, an air exhaust conduit (not shown) may be routed over the remainder 136 of the ceiling to connect to a cabin air exhaust 138, and various electrical conduits 139 may be routed over the remainder 136 of the ceiling to provide power to electrical components within the crew cabin module 100, such as lighting, air conditioning, wall outlets, and the like. Thus, the configuration of FIG. 12 illustrates that interchangeable cabin modules can be built with the optimized dimensions and features of the present technology without having to redesign portions of the ship that receive the modules. The present technology accordingly allows for all of the crew cabins in a ship to have such optimization without necessitating any changes to the deck dimensions or components that provide services to the modules.

Figure 13:
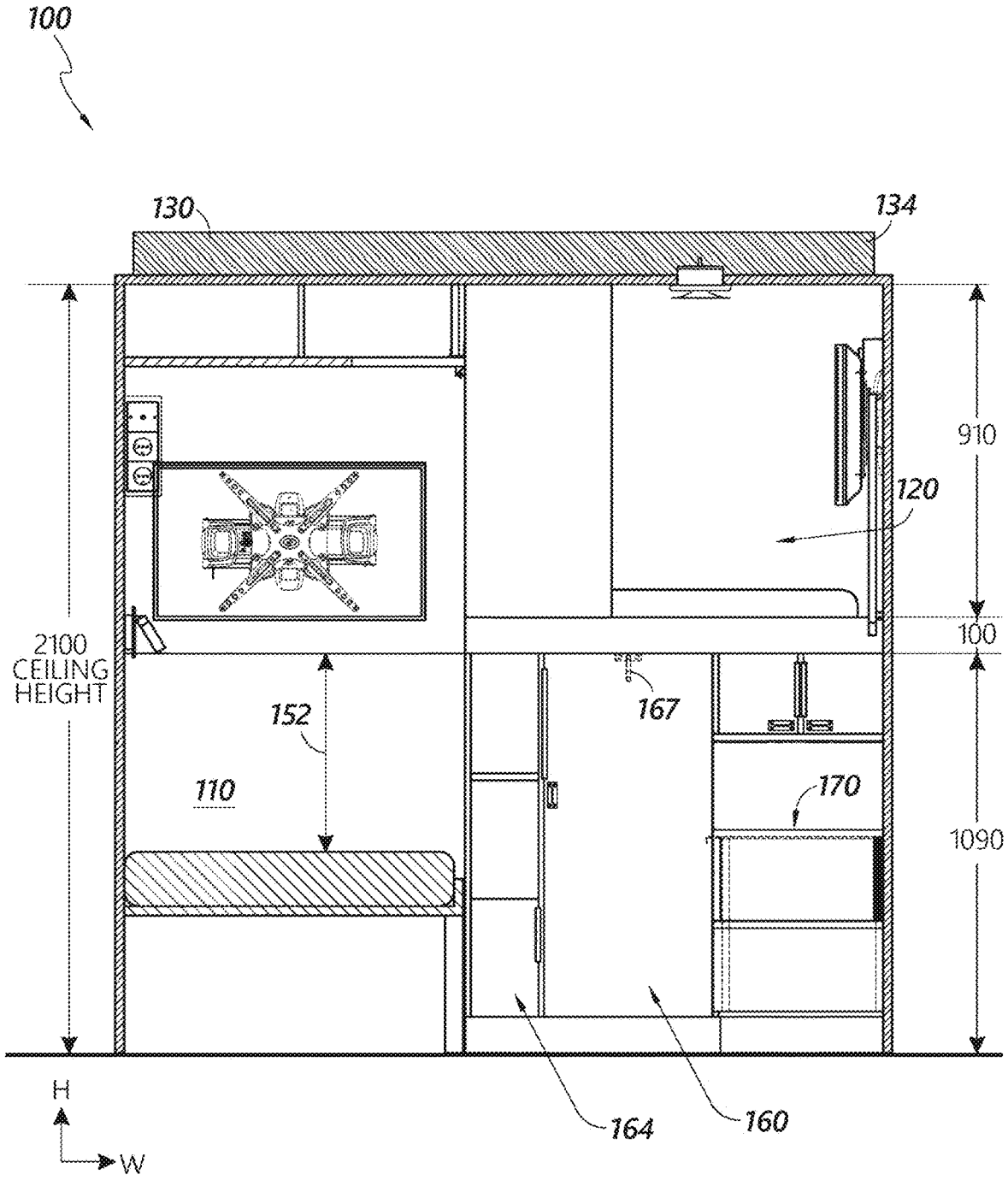
FIGS. 13-15 are cross-sectional elevation views of the example crew cabin module of FIGS. 3-12.
Figure 14:
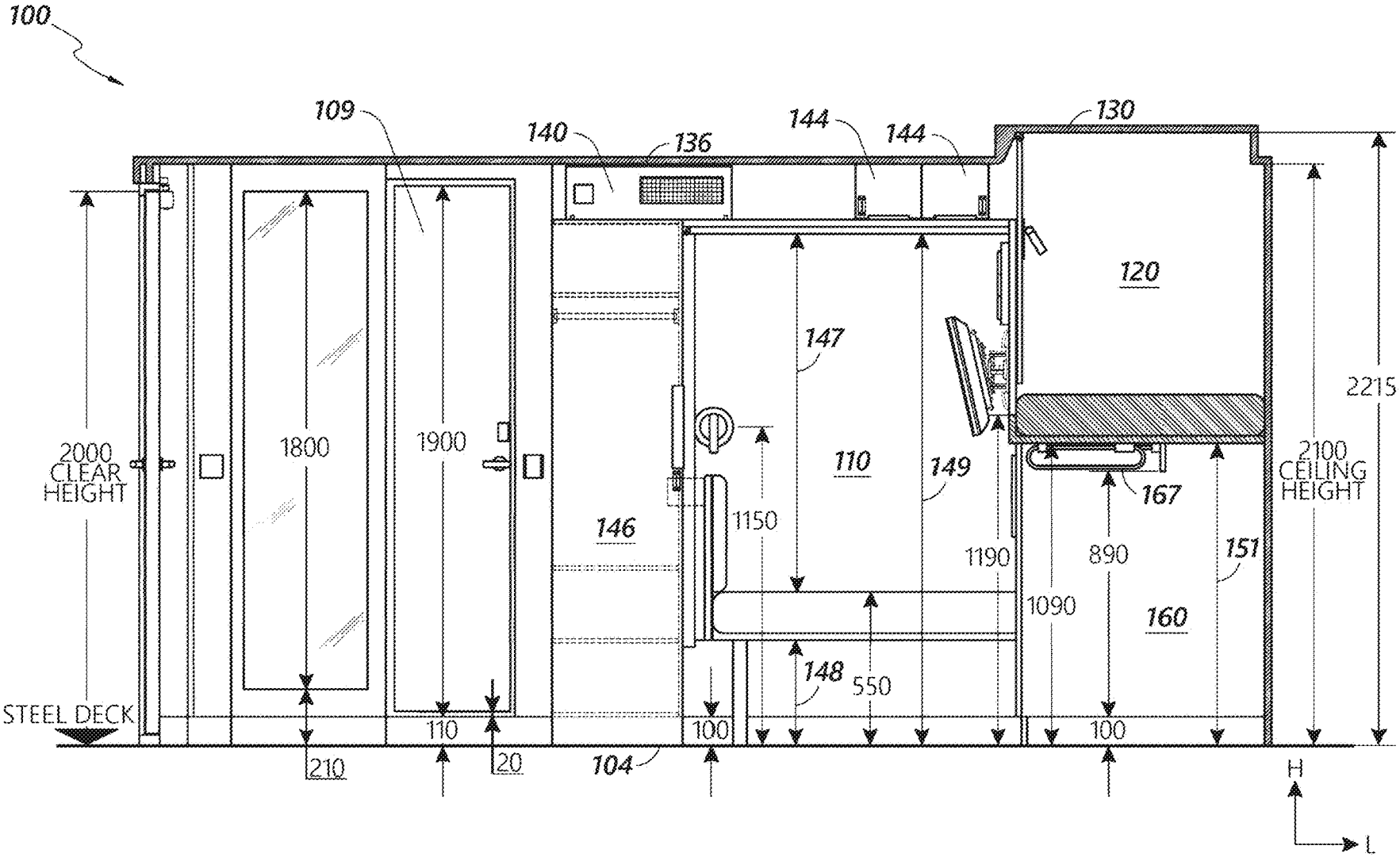
Figure 15:
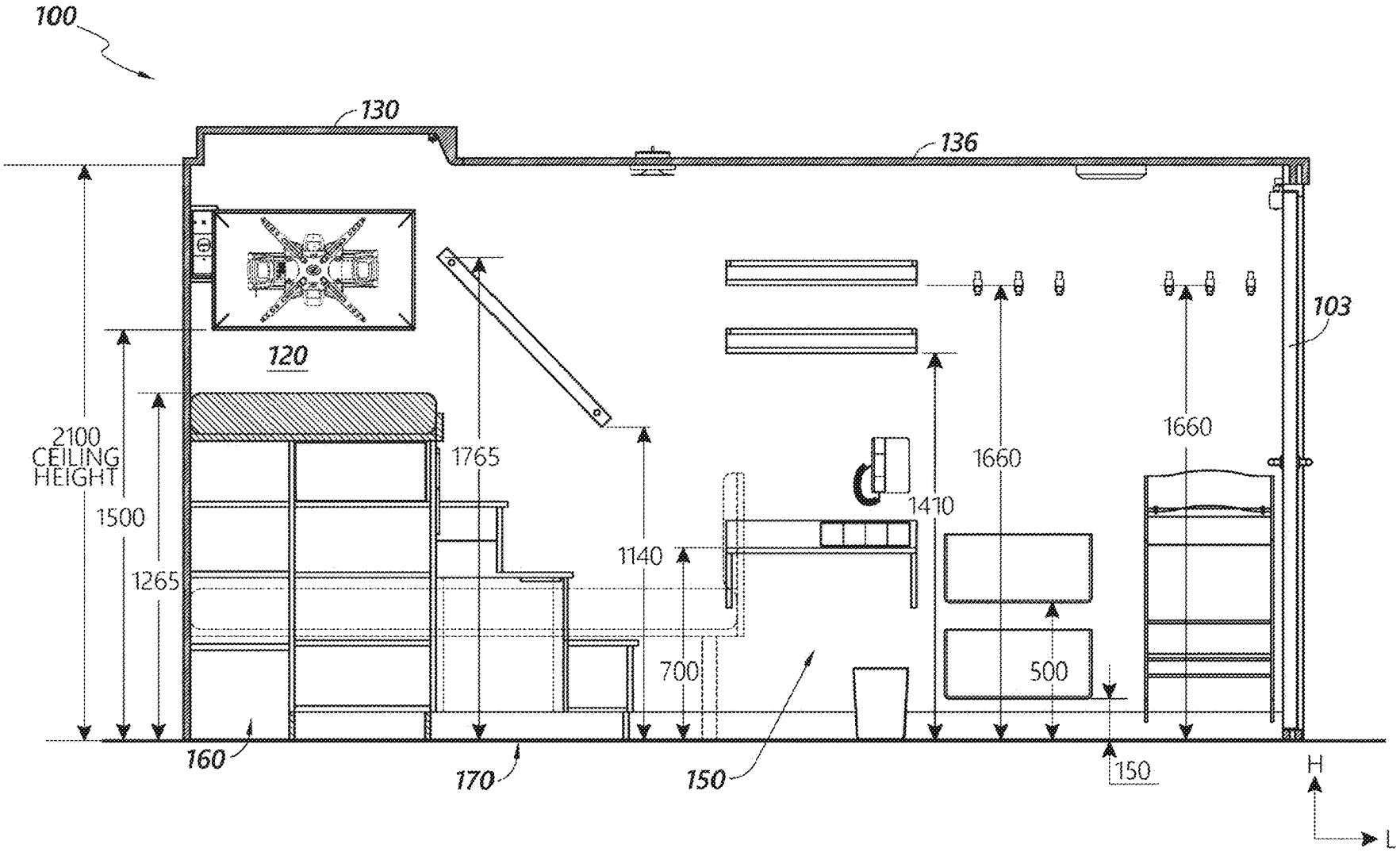
Figure 16:
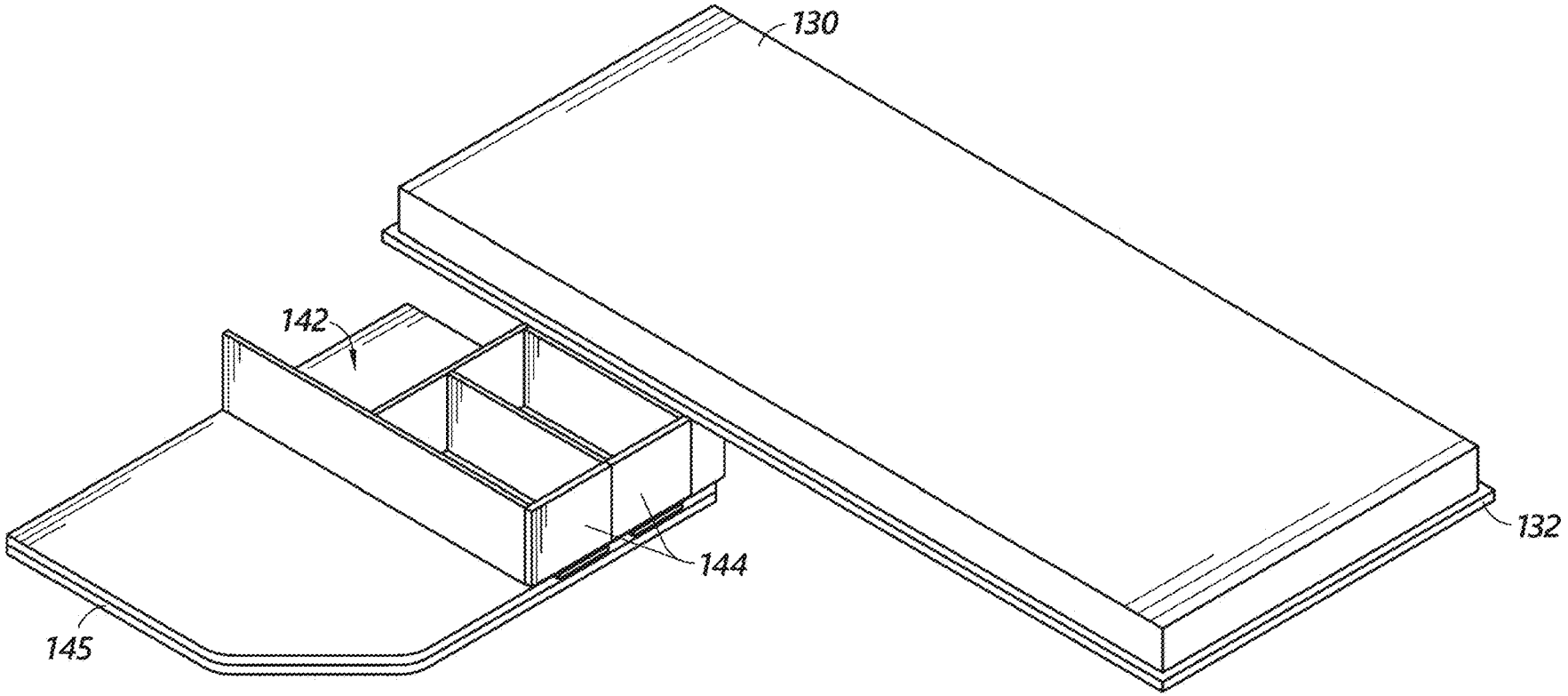
FIG. 16 is a perspective view of upper portions of the example crew cabin module of FIGS. 3-15.
Figure 17:
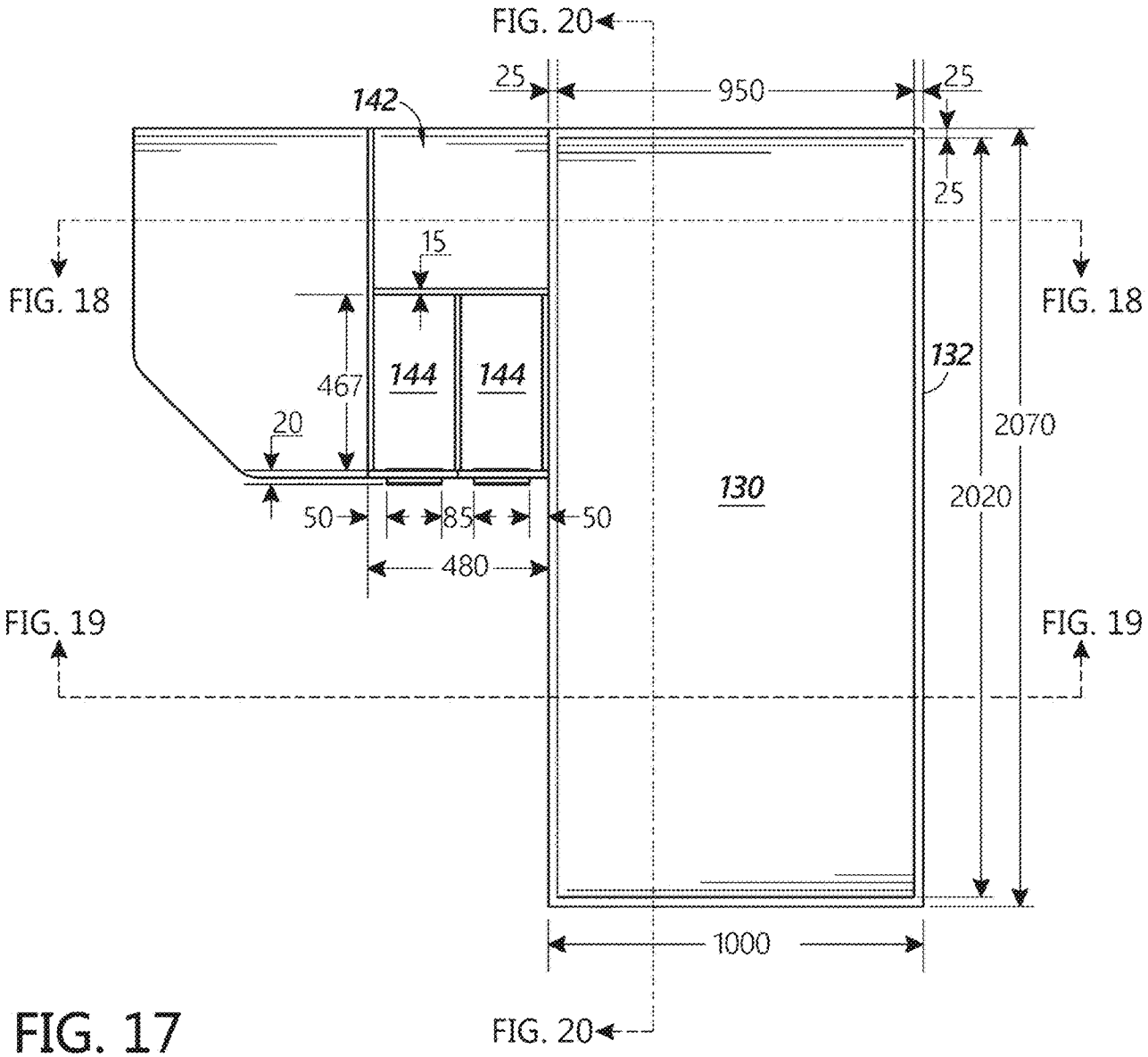
FIG. 17 is a top plan view of the upper portions of FIG. 16.
Figure 18:
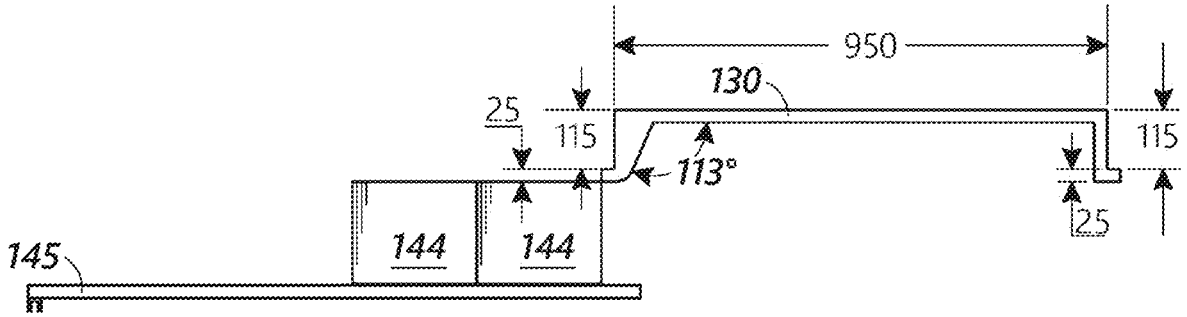
FIGS. 18 and 19 are cross-sectional elevation views of the upper portions of FIGS. 16 and 17.
Figure 19:
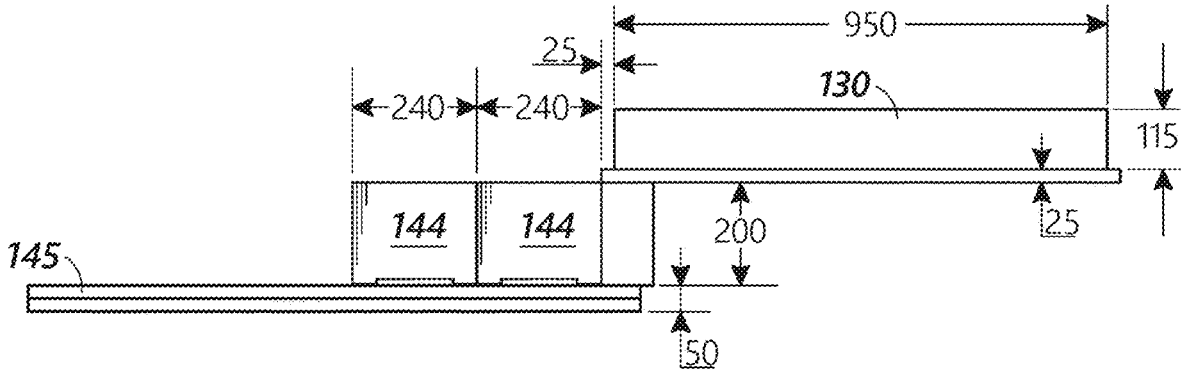

FIGS. 13-15 are cross-sectional elevation views of the example crew cabin module 100, each taken from approximately the center of the crew cabin module 100. The elevation view of FIG. 13 is taken along the length l of the crew cabin module 100 toward the upper bunk 120 and the primary storage area 160. The elevation view of FIG. 14 is taken along the width w of the crew cabin module 100 toward the lower bunk 110. The elevation view of FIG. 15 is taken opposite the view of FIG. 14, along the width w of the crew cabin module 100 toward the multi-use area 150 and the staircase 170.

As indicated by the example dimensions in the elevation views of FIGS. 13-15, the extended ceiling portion 130 permits the upper bunk 120 to have an interior height of up to approximately 1025 mm (e.g., the height of 910 mm to the standard ceiling height, plus an additional height of up to 115 mm provided by the extended ceiling portion 130 of the present technology. In some embodiments, the extended ceiling portion 130 may be lower than the extended ceiling portion 130 depicted in FIGS. 13-15, for example, having a height of approximately 85 mm for a total upper bunk 120 height of approximately 995 mm. However, even a height of 995 mm, or approximately 3 feet 3 inches, still provides sufficient space for a 6-foot-tall occupant to sit up comfortably within the upper bunk 120. In some embodiments, the extended ceiling portion 130 may have a height with a range of about 85 mm to about 115 mm, or any height within this range. Additionally, the extended ceiling portion 130 allows such comfort for the occupant of the upper bunk 120 while still providing sufficient height below the upper bunk 120 within the primary storage area 160 to mount the wardrobe rack 167 at a suitable height for hanging clothes (e.g., approximately 40 inches above the floor 104). Moreover, the interior height 147 of the non-overlapping portion 76 of the lower bunk 110 in this non-limiting example is 1350 mm, such that the interior height of the lower bunk 110 is greater than or equal to the interior height of the upper bunk 120 in some implementations. Thus, embodiments of the present technology that include the combination of the L-shaped bunk configuration and extended ceiling portion 130 allow for a highly efficient use of the space within the crew cabin module 100 providing more comfortable bunk spaces and a greater combined storage volume than previously attainable with conventional cabin module interior configurations.

Moreover, the configuration illustrated in FIGS. 13-15 advantageously provide suitable dimensions for both the lower bunk 110 and the upper bunk 120. For example, height 148 below the lower bunk 110 advantageously accommodates a standard extra large hard-sided luggage piece which may be brought aboard by a crew member and stored beneath the lower bunk 110. For example, the height 148 may be about 369 mm in conjunction with a height 147 of about 1350 mm and an overall height 149 of about 1875 mm. As a result, a first crew member using the lower bunk 110 can store hard-sided luggage having a width dimension as high as 360 mm (14.2 inches) in a storage space under the lower bunk. This means that many pieces of hard-sided pieces of luggage in the industry-standard 28"-30" category can be stored in this space under the lower bunk (e.g., the Samsonite® Freeform 28" Spinner is an example extra large hard-sided luggage piece that is commonly in use among crew members and can be accommodated in a storage space under the lower bunk). Exterior dimensions of the Freeform 28" Spinner are 790 mm (31.1 inches) height×532 mm (20.95 inches) length×350 mm (13.78 inches) width. Moreover, the height 151 (1090 mm in the one non-limiting example embodiment) of the storage space in the interior of the primary storage area 160 behind the wardrobe rack 167 allows a second piece of extra large hard-sided luggage to be stored in the crew cabin. A second crew member using the upper bunk 120 can store hard-sided luggage having a height dimension as high as 900 mm (35.4 inches) in a storage space under the upper bunk. Thus, the crew cabin configurations of the present technology advantageously allow both crew members to bring aboard and store a standard extra large hard-sided luggage piece, which may be especially desirable when crew members are aboard for several months at a time. In contrast, the typical storage under lower bunks of existing crew cabin modules is approximately 320 mm, which is insufficient to accommodate a hard-sided luggage piece in the 28"-30" category.

FIGS. 16-19 provide additional detail and example dimensions of upper portions of the example crew cabin module 100, including the extended ceiling portion 130, an air conditioning unit platform 145, and upper storage compartments 144. The air conditioning unit platform 145 provides a base for the air condition unit 140 illustrated in FIGS. 3-6 and for the upper storage compartments 144, and may further serve as a ceiling for the non-overlapping portion of the lower bunk 110. As shown in FIGS. 16-19, an example extended ceiling portion 130 may have a height of approximately 115 mm, but may be taller or shorter in various embodiments. The lower flange 132 may extend outward around the perimeter of the extended ceiling portion 130 by a relatively small width, such as about 25 mm, to facilitate attachment of the extended ceiling portion 130 to the upper edges of the walls 102 and to the remainder 136 of the ceiling of the crew cabin module 100. Other configurations can be implemented in embodiments of the present technology.

Figure 20:
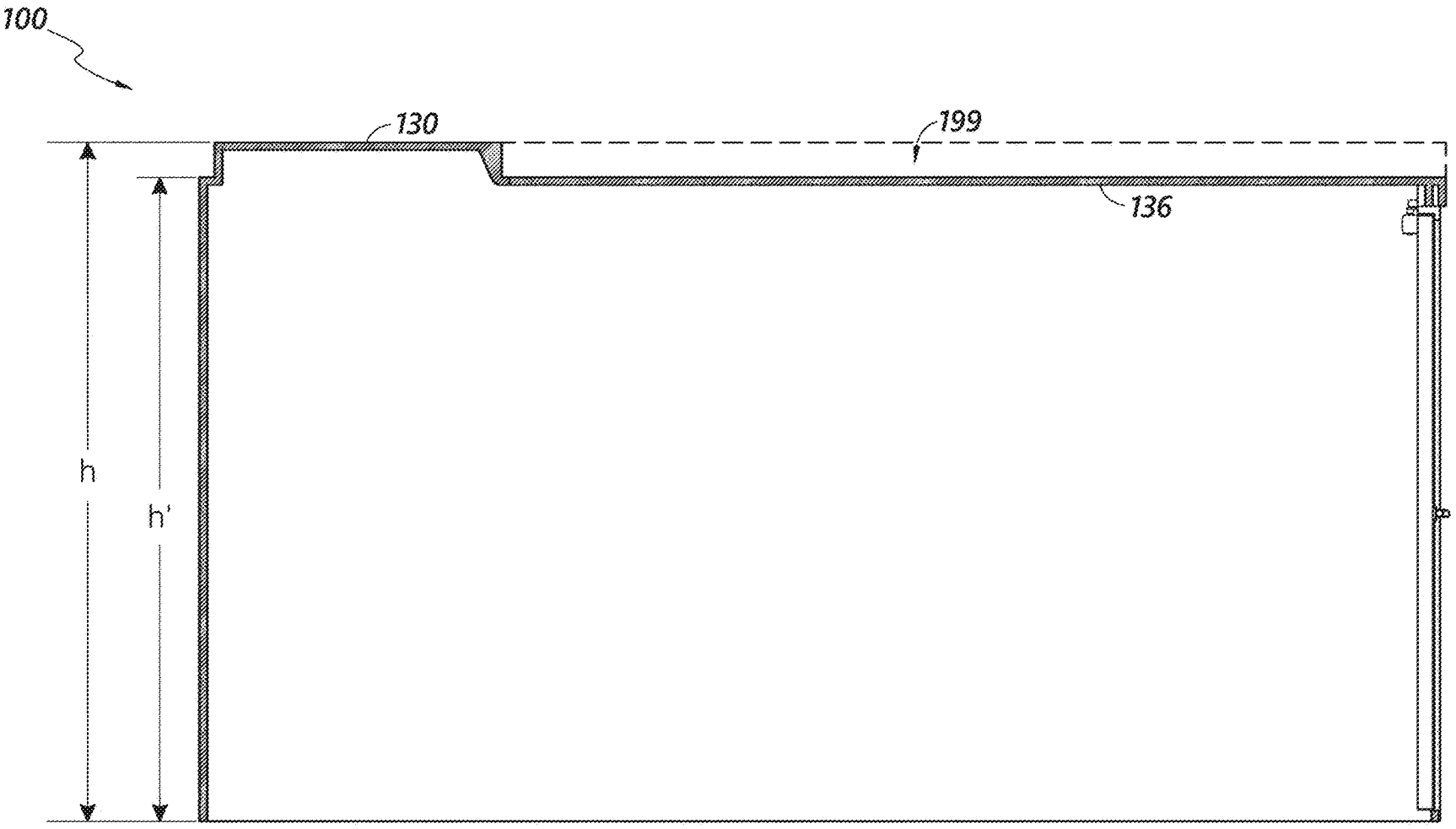
FIG. 20 is a side view schematically illustrating an implementation of an extended ceiling section in accordance with the present technology.

FIG. 20 is a simplified side view of a crew cabin module 100 further illustrating a utility space 199. It will be understood that embodiments of the present disclosure do not require an extended ceiling section 130. However, some embodiments of the present technology may optionally include the extended ceiling section 130. In such non-limiting embodiments, as shown in FIG. 20, the extended ceiling section 130 occupies only a portion of the top of the crew cabin module 100. A utility space 199 is provided for the routing of one or more utility conduits, such as electrical conduits, water supply conduits, air supply conduits, and the like. The utility space 199 has a lower boundary defined by the remainder 136 of the ceiling (e.g., a lower portion of the ceiling at height h' above the bottom of the crew cabin module 100) and an upper boundary defined by the ceiling height h of the extended ceiling section 130.

Figure 21:
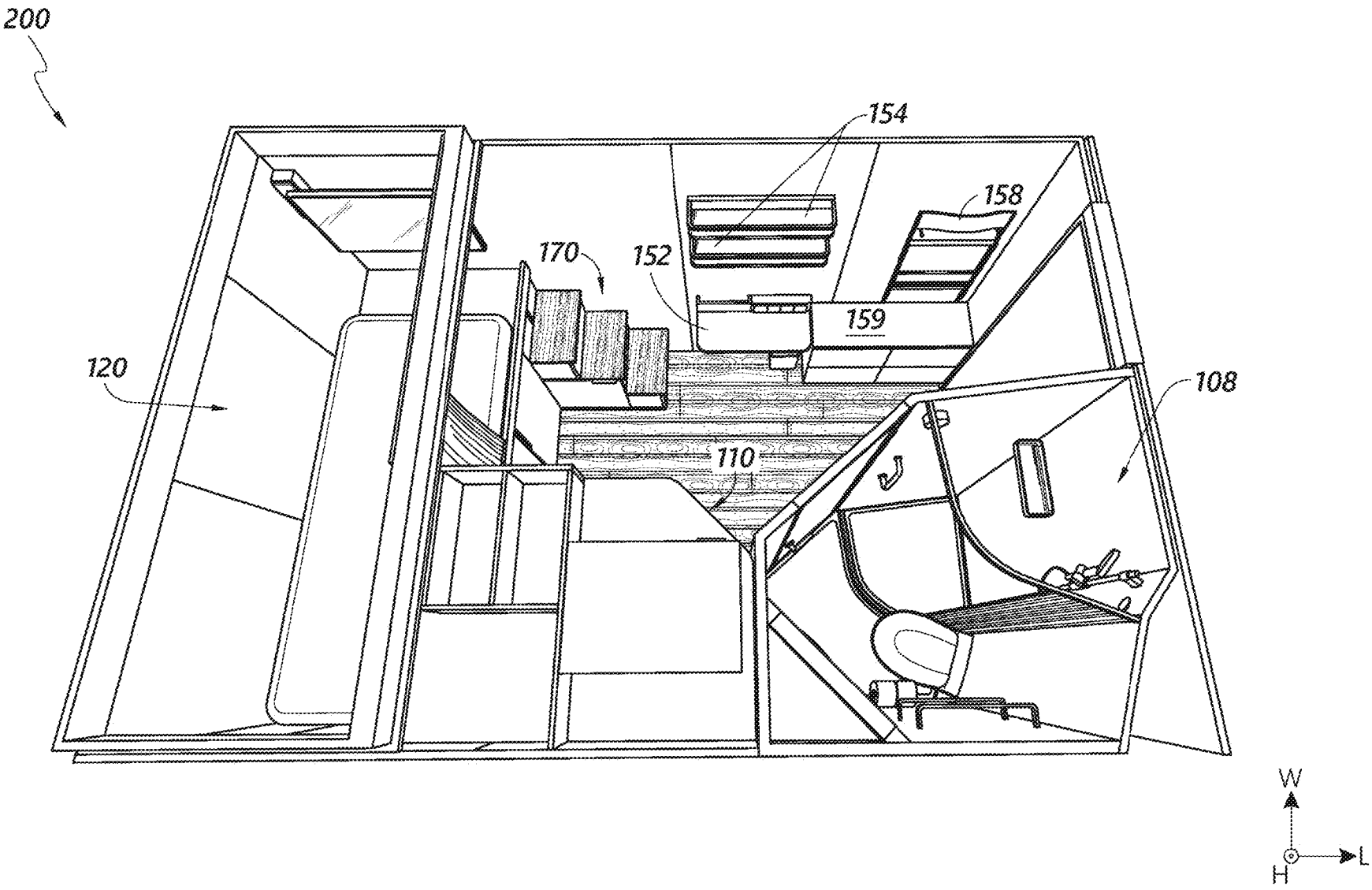
FIG. 21 is an upper left perspective cutaway view of an example crew cabin module in accordance with the present technology.

Various modifications to the interior arrangements of the cabin modules disclosed herein are possible within the present technology. For example, FIG. 21 illustrates a crew cabin module 200 having a further example configuration including a different arrangement relative to the multi-use area 150 of FIGS. 3-6. In the example configuration of the crew cabin module 200, an additional enclosed storage volume 159 can be included within a space between a wall 102 and a door swing area of the door 103, with storage for a chair 158 located higher on the wall 102 to accommodate the additional enclosed storage volume 159. In some embodiments, the crew cabin module 200 has a larger width relative to the crew cabin module 100 of FIGS. 3-6.

Figure 22:
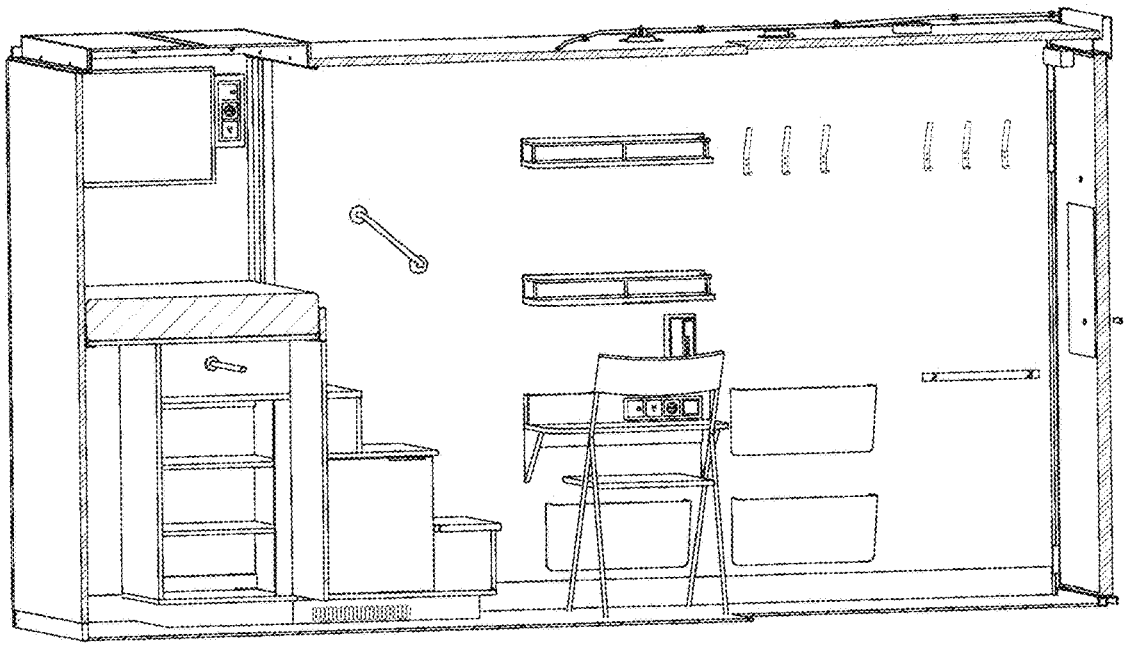
FIGS. 22 and 23 are cutaway perspective views of the example crew cabin module of FIGS. 3-20.
Figure 23:
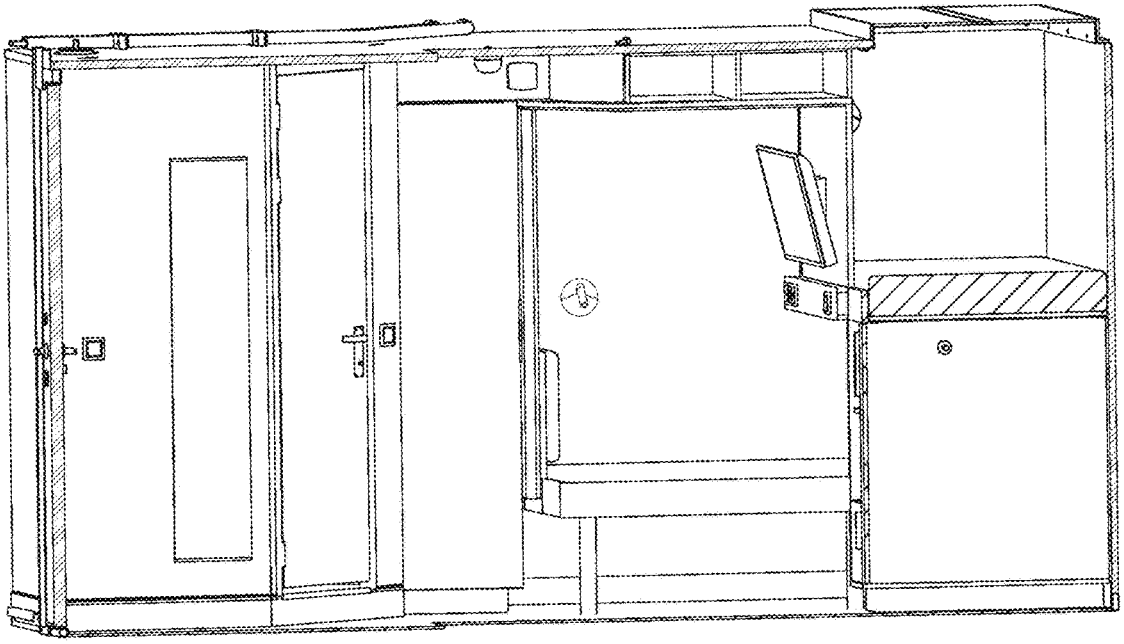

FIGS. 22 and 23 are cutaway perspective views of an example crew cabin module. The example crew cabin module illustrated in FIGS. 22 and 23 corresponds to the crew cabin module 100 depicted and described herein with reference to FIGS. 3-20.

Figure 24:
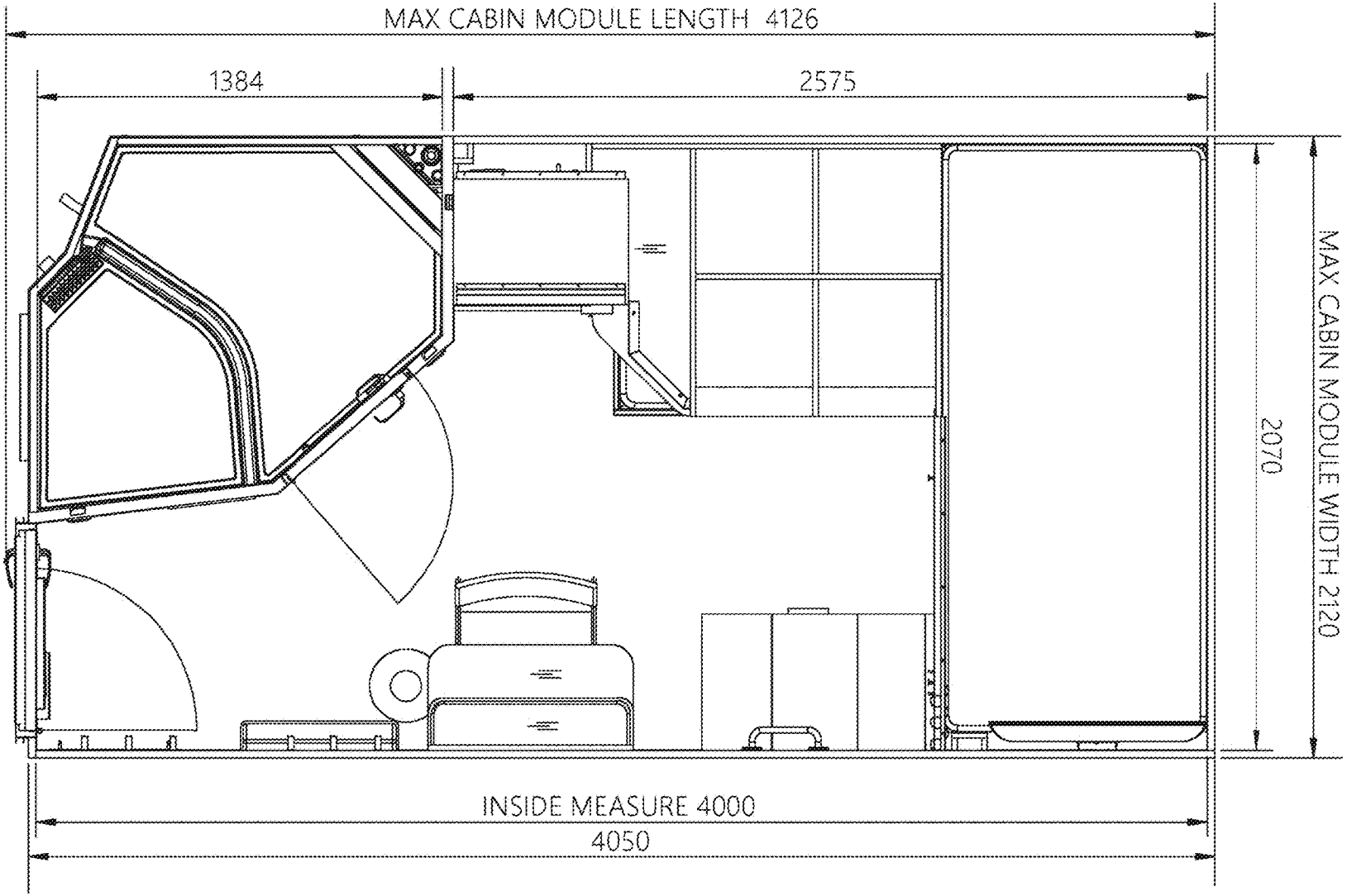
FIGS. 24 and 25 are top plan views illustrating interior and exterior dimensions of example crew cabin modules in accordance with the present technology.
Figure 25:
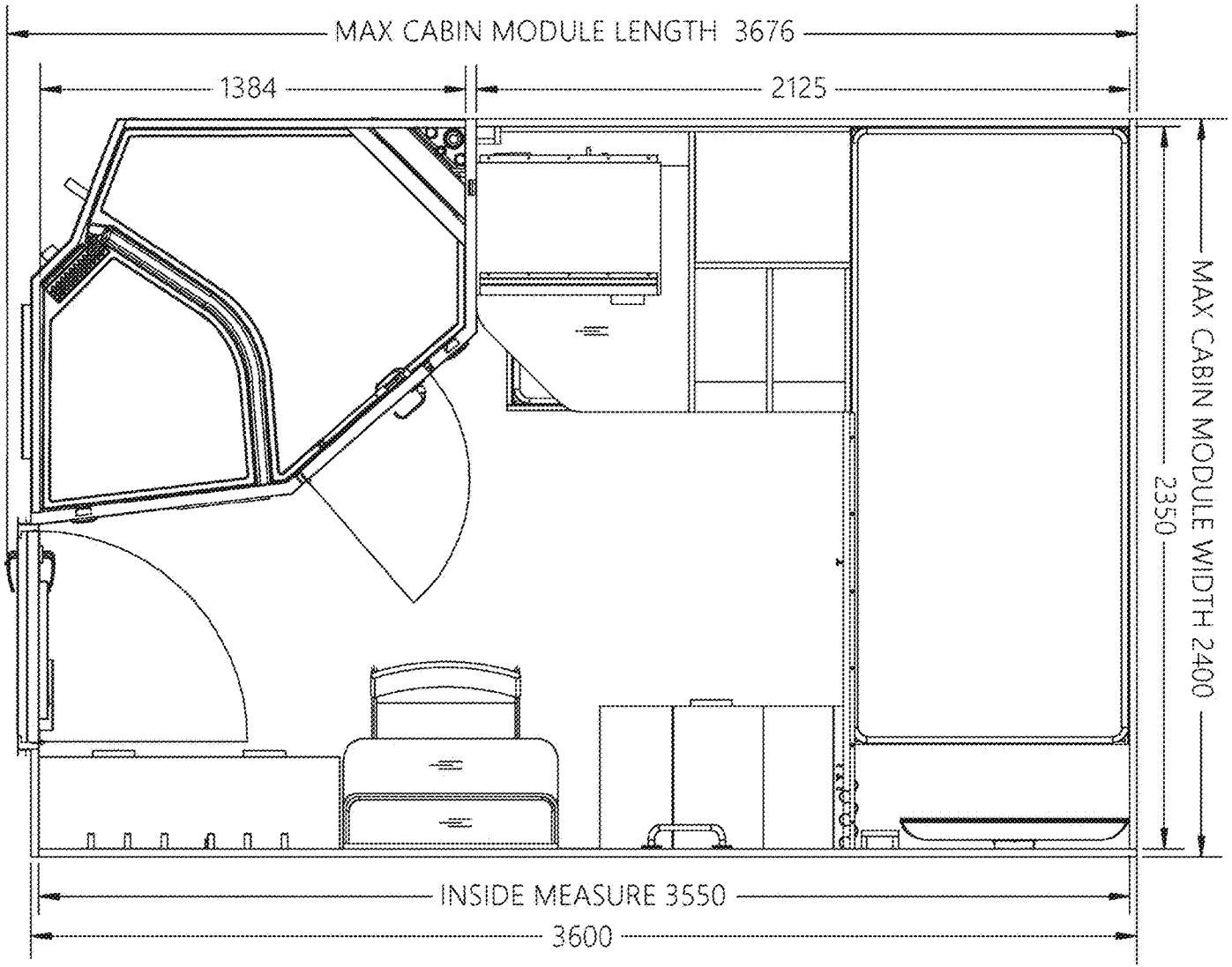

FIGS. 24 and 25 are top plan views illustrating interior and exterior dimensions of example crew cabin modules in accordance with the present technology. The example crew cabin module illustrated in FIG. 24 corresponds to the crew cabin module 100 depicted and described herein with reference to FIGS. 3-20. The example crew cabin module illustrated in FIG. 25 corresponds to the crew cabin module 200 depicted and described herein with reference to FIG. 21. The exemplary and non-limiting dimensions given in FIGS. 24 and 25 illustrate how the interior and exterior dimensions of the crew cabin modules disclosed herein may be selected to fit within given maximum dimensions, such as the maximum cabin module lengths and widths given in FIGS. 24 and 25, each of which may correspond to an industry standard crew cabin module space size (e.g., a size of the spaces 30 as shown in FIGS. 1A and 1B).

Advantages of Embodiments of the Present Technology

As illustrated by the drawings and the foregoing description, the modular crew cabin systems and crew cabin modules of the present technology provide a number of advantages over existing modular cabin systems. Providing two bunks disposed adjacent to two different walls in an L-shaped bunk configuration allows for two occupants of a crew cabin module to each have a comfortable bunk in which a person up to about 6 feet tall can comfortably sit upright. The inventors have advantageously discovered that a person up to 6 feet, 2 inches tall can comfortably sit upright in embodiments of the crew cabin modules described herein. Although not required, an extended ceiling section 130 may also be implemented to increase the vertical dimensions of the interior volumes of the bunks. Moreover, the present technology allows for a crew cabin module to provide such comfort in addition to over one cubic meter of storage, a bathroom, and a multi-use area, while being interchangeably installable within an industry-standard crew cabin space. Thus, the crew cabin modules of the present technology may readily be installed within the crew cabin spaces of existing ships without requiring any modification or redesign of the existing ships.

Advantageously, as described above, embodiments of the crew cabin modules described herein provide storage for at least two extra large (28"-30" category), hard-sided luggage articles that are commonly used by crew members working on a ship for extended periods. The extra large, hard-sided luggage articles in common use typically have a width dimension in the range of 13 to 14 inches (330-355 mm). Typical crew cabins do not accommodate a single piece of extra large piece of hard-sided luggage, much less two pieces as in embodiments of the present disclosure.

Additionally, embodiments of the crew cabin modules described herein can include a lower bunk that is sized and shaped to accommodate a crew member as tall as 6 feet, 2 inches tall. As explained above, embodiments of the crew cabin modules of the present technology do not sacrifice the dimensions of either the non-overlapping portion or the overlapping portion of the lower bunk at the expense of upper bunk dimensions. In non-limiting examples of the present technology, the height of the portion of the lower bunk that does not overlap with the upper bunk can be as large as 1350 mm. Advantageously, this dimension has been found to comfortably accommodate the upper body of an individual that is 6 feet, 2 inches tall sitting in the lower bunk. In addition, in these non-limiting examples of the present technology, the height of the portion of the lower bunk that overlaps with the upper bunk can also be as large as 540 mm. Advantageously, this dimension has been found to comfortably accommodate the lower body (in particular the feet and/or knees) of an individual that is 6 feet, 2 inches tall laying down in the lower bunk. Lower bunks having these advantageous dimensions ensure that both crew members in a 2-person crew cabin experience similar accommodations in their respective bunks, enhancing all crew members' experiences and improving morale.

In particularly advantageous embodiments of the crew cabin modules described herein, the crew cabin module includes a lower bunk that is sized and shaped to accommodate a crew member as tall as 6 feet, 2 inches sitting upright, an upper bunk that is sized and shaped to accommodate a crew member up to about 6 feet tall sitting upright, a wardrobe having a suitable height for hanging clothes (e.g., approximately 40 inches above the floor), and locations to store two extra large (28"-30" category), hard-sided luggage pieces. Embodiments of the crew cabin modules having this unique combination of bunk and storage features are particularly advantageous to enhance crew member experience and morale.

Importantly, a pop-up section that expands the height of a crew cabin module in a limited section as described herein only uses a very minimal amount of utility space, while enabling at least the following advantageous features to be provided to crew members:

- a two-bunk configuration in which both crew members can sit upright in their respective bunks;
- a lower bunk having a portion that accommodates the lower body portion of a person as tall as 6 feet, 2 inches;
- storage for two extra large (28"-30" category), hard-sided luggage pieces;
- two separate and distinct wardrobes each having a suitable height for hanging clothes;
- a lower bunk having a portion of sufficient height from the floor that a person as tall as 6 feet, 2 inches tall can easily enter and exit the lower bunk; and
- a two-bunk configuration in which display screens are optimally positioned for viewing while lying down in each bunk, or any combination of the above advantageous features. Accordingly, the use of a very minimal amount of utility space as described herein makes it possible to implement a substantial number of features that enhance quality of life for crew members.

Additionally, embodiments of present technology include a plurality of identical crew cabin modules that are uniquely sized and shaped to be received in a plurality of decks having varying heights and hull constraints. This allows a maximum number of crew cabin modules having advantageous features described herein to be installed in ships having deck sizes with industry-standard heights that vary from deck to deck. For example, embodiments of the modular crew cabins can be installed in decks varying in height from 2.7 m to 3.2 m high, without having to change or reconfigure any aspect of the modular crew cabins. Further, embodiments of the present technology can include two modular crew cabin configurations: a first modular crew cabin configuration having a first width, a first length, and a first height (and additionally a pop-up section having a greater height as described herein), and a second modular crew cabin configuration having a second width greater than the first width, a second length less than the first length, and the first height (and additionally the pop-up section as described herein). In one non-limiting example, the first modular crew cabin configuration has a length of about 4126 mm and a width of about 2120 mm, and the second modular crew cabin configuration has a length of about 3676 mm and a width of about 2350 mm.

Figure 26A:
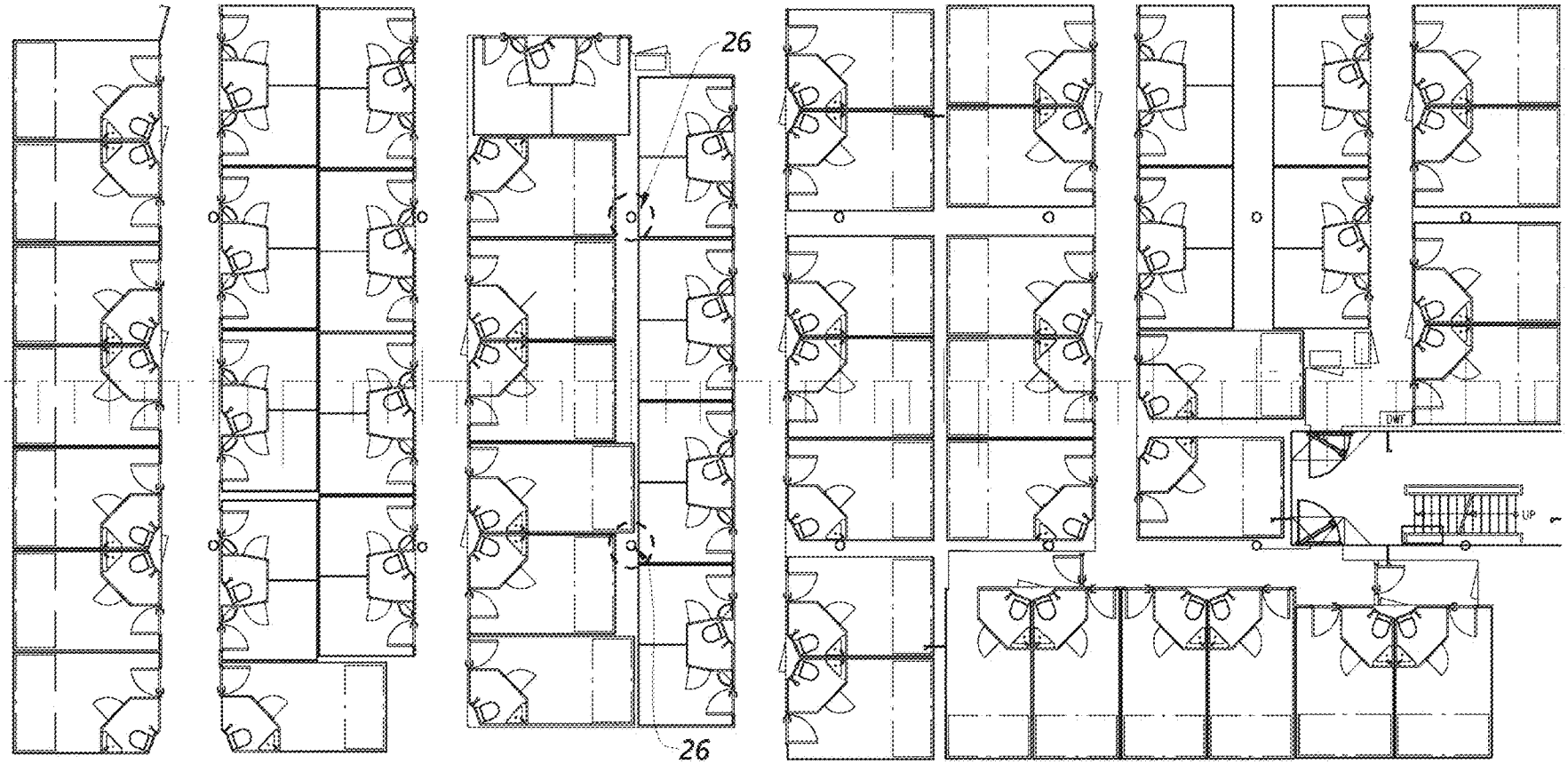
FIGS. 26A and 26B are top plan views illustrating two example arrangements of a plurality of first crew cabin modules and a plurality of second, different crew cabin modules on a deck of a ship in accordance with the present technology.
Figure 26B:
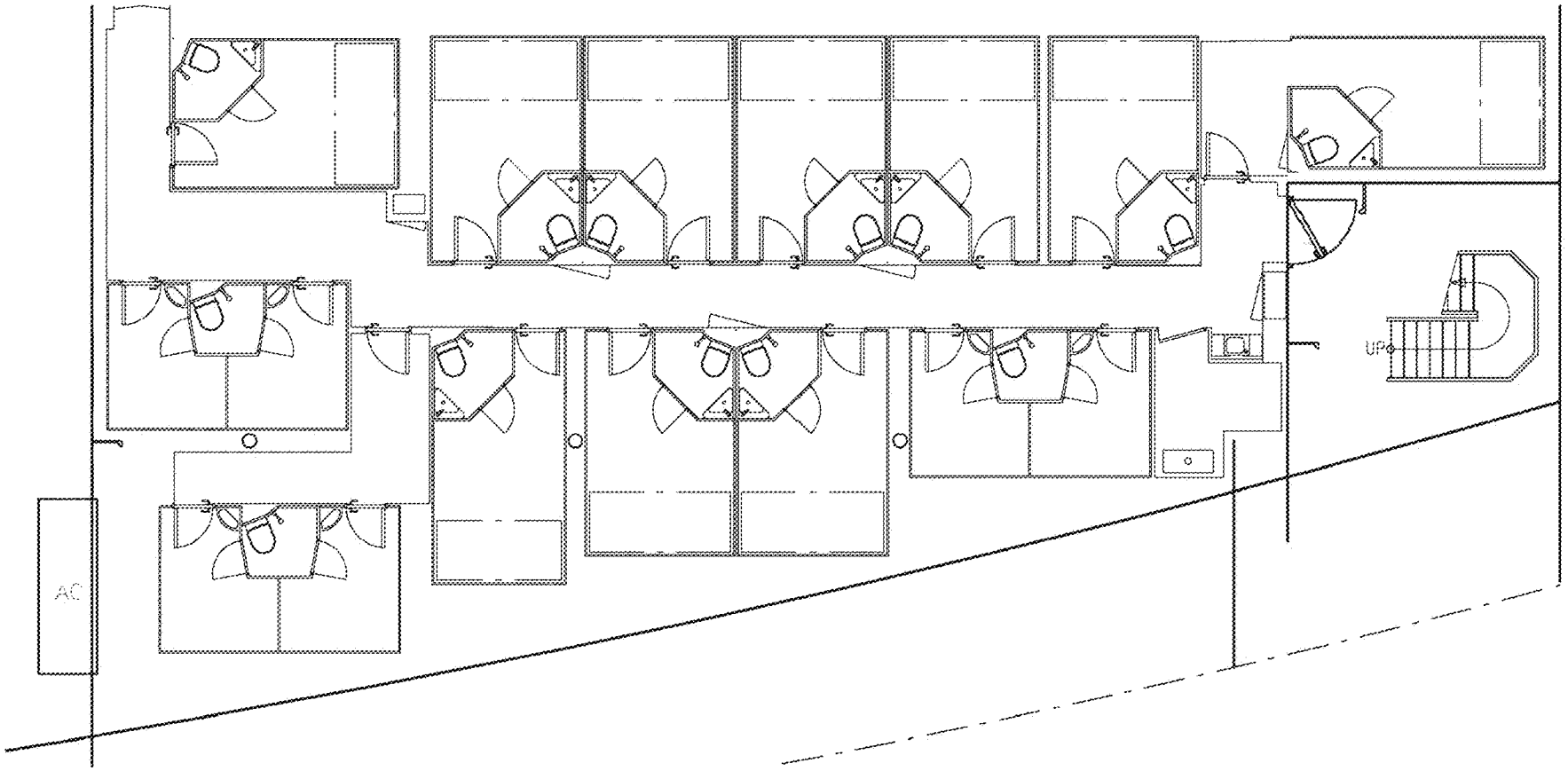

In one non-limiting example illustrated in FIG. 26A, a combination of the first modular crew cabin configuration (indicated as modules EE3.2A) and the second modular crew cabin configuration (indicated as modules EE3.2B) may be implemented to efficiently install an optimal number of crew cabin modules within an irregular space. FIG. 24 illustrates an example implementation of a first modular crew cabin configuration indicated as EE3.2A in FIG. 26A, and FIG. 25 illustrates an example implementation of a second modular crew cabin configuration indicated as EE3.2B in FIG. 26A. For example, in some embodiments, ship services such as fan cool units, ventilation, firefighting systems, and the like (e.g., ship services 26 shown in FIG. 26A) may prevent the use of the first modular crew cabin configuration for all of the crew cabins in a portion of a deck by occupying a portion of the space that would be occupied by the full length of the first crew cabin module. Accordingly, the second modular crew cabin configuration, which has a shorter length than the first modular crew cabin configuration, may be installed in locations where such ship services 26 are present. However, because both the first modular crew cabin configuration and the second modular crew cabin configuration have identical height dimensions, they can be arranged interchangeably as needed to maximize the number of modular crew cabins that can be installed on a deck, while still ensuring crew members in both types of modular crew cabin configurations have enhanced living quarters including the various advantages described herein. In another non-limiting example illustrated in FIG. 26B, one or more configurations of the crew cabin modules disclosed herein may be utilized to accommodate various irregularities in the shapes of crew cabin decks. For example, constraints associated with the hull shape in the forward section of each deck ordinarily lead to a reduction in the size of crew member living quarters. An example portion of the forward section of a deck is illustrated in FIG. 26B. However, as shown in FIG. 26B, the first and second modular crew cabin configurations of the present technology can be advantageously combined, staggered, or otherwise arranged to optimize placement of crew cabin modules, while still ensuring crew members in both types of modular crew cabin configurations have enhanced living quarters having various advantages of the modular crew cabin systems described herein.

Additional Embodiments

It will be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

The present technology optimizes modular crew cabins for a current industry-standard of sizes, dimensions, and/or volume of cabin module. However it will be understood that this is merely an example implementation. Different industry-standard criteria may apply to different types of ships, such as cargo or military crew berthing, and industry-standard criteria may also change from time to time. The presently-disclosed configurations can be adjusted to accommodate these differences in industry-standard dimensions for modular crew cabins.

The terms "about" or "approximate" and the like are synonymous and are used to indicate that the value modified by the term has an understood range associated with it, where the range can be ±20%, ±15%, ±10%, ±5%, or ±1%. The term "substantially" is used to indicate that a result (e.g., measurement value) is close to a targeted value, where close can mean, for example, the result is within 80% of the value, within 90% of the value, within 95% of the value, or within 99% of the value.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to illustrative embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A [modular crew] cabin *module* system comprising:

a first space within a deck of a ship defined by a first length, a first width, and a first height;

a second space within the deck defined by the first length, the first width, and the first height; and a plurality of [modular crew cabins] *cabin modules* interchangeably installable in either the first space or the second space, each [modular crew] cabin *module* comprising:

four walls forming sides of the [modular crew] cabin *module*;

a floor coupled to a portion of at least one of the four walls to form a bottom of the [modular crew] cabin *module*;

a lower bunk adjacent to a first wall of the four walls, the lower bunk having a major axis parallel to the first wall;

an upper bunk adjacent to a second wall of the four walls, the upper bunk being partially disposed above the lower bunk and having a major axis perpendicular to the major axis of the lower bunk such that the lower bunk and the upper bunk are in an L-shaped configuration; and a ceiling coupled to a portion of at least one of the four walls to form a top of the [modular crew] cabin *module*, the ceiling comprising:

a pop-up portion disposed above at least a portion of the upper bunk at a first ceiling height relative to the floor; and a lower portion adjacent to the pop-up portion and [covering a remainder of the crew cabin at] *having* a second ceiling height less than the first ceiling height relative to the floor.

2. The [modular crew] cabin *module* system of claim 1, wherein the first ceiling height is between 85 millimeters and 115 millimeters greater than the second ceiling height.

3. The [modular crew] cabin *module* system of claim 1, wherein the second ceiling height is about 2.1 meters.

4. The [modular crew] cabin *module* system of claim 3, wherein the first ceiling height is between about 2.185 meters and about 2.215 meters.

5. The [modular crew] cabin *module* system of claim 1, wherein each [modular crew] cabin *module* further comprises a storage volume disposed below a portion of the upper bunk and adjacent to a portion of the lower bunk.

6. The [modular crew] cabin *module* system of claim 5, wherein the storage volume has an interior volume of at least 1 cubic meter.

7. The [modular crew] cabin *module* system of claim 5, wherein each [modular crew] cabin *module* further comprises a staircase for accessing the upper bunk, the staircase disposed adjacent to a third wall of the four walls opposite the first wall.

8. The [modular crew] cabin *module* system of claim 7, wherein each [modular crew] cabin *module* further comprises at least one storage volume disposed within the staircase.

9. The [modular crew] cabin *module* system of claim 1, wherein each [modular crew] cabin *module* further comprises connections for bathroom facilities and a desk, and wherein:

the first length is less than or equal to 4 meters;

the first width is less than or equal to 2.1 meters;

the first height is less than or equal to 2.3 meters; and each [modular crew] cabin *module* includes at least partially enclosed storage volumes having a combined volume of greater than 1 cubic meter.

10. The [modular crew] cabin *module* system of claim 1, wherein at least a portion of each of the lower bunk and the upper bunk has an interior height of greater than 1 meter.

11. The [modular crew] cabin *module* system of claim 10, wherein each [modular crew] cabin *module* further comprises a suitcase storage volume having a height of at least 13 inches between the floor and an underside of the lower bunk.

12. The [modular crew] cabin *module* system of claim 1, further comprising one or more utility conduits disposed within a space having a lower boundary defined by the lower portion of the ceiling and an upper boundary defined by the first ceiling height relative to the floor.

13. The [modular crew] cabin *module* system of claim 1, wherein at least a first [modular crew] cabin *module* of the plurality of [modular crew cabins] *cabin modules* has a length different from at least a second [modular crew] cabin *module* of the plurality of [modular crew cabins] *modules*.

14. A [crew] cabin module installable within a deck of a ship, the crew cabin module comprising:

four walls forming sides of the [crew] cabin module;

a floor coupled to a portion of at least one of the four walls to form a bottom of the [crew] cabin module;

a lower bunk adjacent to a first wall of the four walls, the lower bunk having a major axis parallel to the first wall;

an upper bunk adjacent to a second wall of the four walls, the upper bunk being partially disposed above the lower bunk and having a major axis perpendicular to the major axis of the lower bunk such that the lower bunk and the upper bunk are in an L-shaped configuration; [and]

a ceiling coupled to a portion of at least one of the four walls to form a top of the [crew] cabin module, the ceiling comprising:

a pop-up portion disposed above at least a portion of the upper bunk at a pop-up ceiling height of greater than about 2.1 meters relative to the floor; and a lower portion adjacent to the pop-up portion and [covering a remainder of the crew cabin at] *having* a lower ceiling height of about 2.1 meters relative to the floor*;*

*a storage volume disposed below a portion of the upper bunk and adjacent to a portion of the lower bunk; and*

*a staircase for accessing the upper bunk, the staircase disposed adjacent to a third wall of the four walls opposite the first wall.*

15. The [crew] cabin module of claim 14, wherein the pop-up ceiling height is at least about 2.185 meters.

16. The [crew] cabin module of claim 14, wherein the pop-up ceiling height is between about 2.185 meters and about 2.215 meters.

[17. The crew cabin module of claim 14, further comprising a storage volume disposed below a portion of the upper bunk and adjacent to a portion of the lower bunk.]

18. The [crew] cabin module of claim [17] *14*, wherein the storage volume comprises a clothing rack slidable between a first position within the storage volume and a second position substantially outside of the storage volume.

[19. The crew cabin module of claim 17, further comprising a staircase for accessing the upper bunk, the staircase disposed adjacent to a third wall of the four walls opposite the first wall.]

20. The [crew] cabin module of claim [19] *14*, further comprising at least one storage volume disposed within the staircase.

21. The [crew] cabin module of claim 14, wherein at least a portion of each of the lower bunk and the upper bunk has an interior height of greater than 1 meter.

22. The [crew] cabin module of claim 21, wherein each modular [crew] cabin further comprises a suitcase storage volume having a height of at least 13 inches between the floor and an underside of the lower bunk.

23. The [crew] cabin module of claim 14, further comprising a bathroom and a desk, wherein:

the [crew] cabin module fits within a space having a length less than or equal to 4 meters, a width less than or equal to 2.1 meters, and a height less than or equal to 2.3 meters; and the [crew] cabin module includes at least partially enclosed storage volumes having a combined volume of greater than 1 cubic meter.

* * * * *